US00RE40398E

(19) United States
(12) Reissued Patent
Brueckheimer et al.

(10) Patent Number: US RE40,398 E
(45) Date of Reissued Patent: Jun. 24, 2008

(54) ATM TELECOMMUNICATIONS SYSTEMS AND METHOD FOR ROUTING NARROW BAND TRAFFIC

(75) Inventors: Simon Daniel Brueckheimer, London (GB); David John Stacey, Newbury (GB); Roy Harold Mauger, Herts (GB)

(73) Assignee: Nortel Networks Limited, St. Laurent, Quebec (CA)

(21) Appl. No.: 11/055,787

(22) PCT Filed: Jul. 3, 1997

(86) PCT No.: PCT/GB97/01779

§ 371 (c)(1),
(2), (4) Date: Apr. 29, 1999

(87) PCT Pub. No.: WO98/02012

PCT Pub. Date: Jan. 15, 1998

Related U.S. Patent Documents

Reissue of:
(64) Patent No.: 6,519,257
Issued: Feb. 11, 2003
Appl. No.: 09/202,423
Filed: Apr. 29, 1999

(30) Foreign Application Priority Data

Jul. 5, 1996 (GB) ..... 9614138

(51) Int. Cl.
*H04L 12/28* (2006.01)
*H04L 12/56* (2006.01)

(52) U.S. Cl. ..... 370/395.2; 370/395.61

(58) Field of Classification Search ..... None
See application file for complete search history.

(56) References Cited

U.S. PATENT DOCUMENTS

| | | | | | |
|---|---|---|---|---|---|
| 5,428,607 | A | * | 6/1995 | Hiller et al. | 370/352 |
| 5,479,402 | A | * | 12/1995 | Hata et al. | 370/397 |
| 5,483,527 | A | | 1/1996 | Doshi et al. | |
| 5,600,641 | A | | 2/1997 | Duault et al. | 370/400 |
| 5,790,522 | A | | 8/1998 | Fichou et al. | 370/236 |
| 6,016,319 | A | | 1/2000 | Kshirsagar et al. | 370/399 |

FOREIGN PATENT DOCUMENTS

| | | |
|---|---|---|
| EP | 0 599 764 A1 | 10/1993 |
| GB | 2 269 724 | 2/1994 |
| GB | 2 288 297 A | 10/1995 |
| GB | 2 290 433 | 12/1995 |
| GB | 2 305 812 | 4/1997 |

OTHER PUBLICATIONS

Georgatsos et al, A Management System for Load Balancing Through Adaptive Routing in Multi–Service ATM Networks, Mar. 1996, Proceedings IEEE INFOCOM '96, p. 863–870.

* cited by examiner

*Primary Examiner*—Bob A. Phunkulh
(74) *Attorney, Agent, or Firm*—Barnes & Thornburg, LLP

(57) ABSTRACT

A telecommunications system comprises an asynchronous transfer mode (ATM) network having uncommitted bandwidth, and a plurality of adaptive grooming routers (AGR) coupled to the network. The AGRs comprise a group adapted to function as a virtual transit exchange whose fabric and control are distributed over the group. The virtual comprising the AGRs incorporates independent connection control and call routing functions and has means for determining the current system status whereby to set up narrow band connections across the ATM network based on that status determination.

66 Claims, 20 Drawing Sheets

ATM TELECOMMUNICATIONS SYSTEMS AND METHOD FOR ROUTING NARROW BAND TRAFFIC

Matter enclosed in heavy brackets [ ] appears in the original patent but forms no part of this reissue specification; matter printed in italics indicates the additions made by reissue.

TELECOMMUNICATIONS SYSTEM

*More than one reissue application has been filed for the reissue of U.S. Pat. No. 6,519,257. The reissue application Ser. Nos. are: 11/759,494; 11/759,508; 11/759,481; and 11/055,787. Application Ser. Nos. 11/757,494 and 11/759,508 are divisional applications of parent reissue application Ser. Nos. 11/055,787 and 11/759,481 is a continuation of parent reissue application Ser. No. 11/055,787.*

This invention relates to digital communications systems and in particular to systems embodying asynchronous transfer mode (ATM) technology.

BACKGROUND OF THE INVENTION

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL).

A discussion of ATM adaptation of narrow band traffic is given in specification No GB-A-2,290,433 (EP 9411944) which describes a system and method in which an adaptive virtual junctor is used to adapt an ATM switch to perform a narrow band .e.g. 64 kb/s, switching function whereby to carry narrow band services on a broadband network As telecommunications networks increase in complexity and carry increasing volumes of traffic, the current procedures for setting up connections between subscribers are limiting the performance of these networks. In particular, congestion may be caused by attempting to connect to a subscriber who is already busy, or by attempting to choose a route through an already congested part of the network. Thus equipment and resources can be wasted in attempts to set up calls which cannot be completed. A further problem is that of scalability. As the network expands to accommodate increased traffic and a larger number of subscribers, there is an increasing need to facilitate integration of new equipment into an existing network without simply increasing the congestion problem.

SUMMARY OF THE INVENTION

The object of the invention is to minimise or to overcome these disadvantages.

According to one aspect of the present invention there is provided a distributed telecommunications exchange system having independent call routing and connection control for setting up connections across the system.

According to another aspect of the invention there is provided a telecommunications system, including an asynchronous transfer mode (ATM) network, and a plurality of adaptive grooming routers (AGR) coupled to the network, wherein the AGRs comprise a group adapted to function as a single distributed or virtual transit exchange whereby in use to set up narrow band connections across the ATM network.

According to one aspect of the present invention there is provided a distributed telecommunications exchange system having means for determining the current status of the system whereby to effect routing of narrow band traffic across the system.

According to another aspect of the invention there is provided a method of communicating resource availability to maintain performance of a distributed exchange system under overload conditions.

According to a further aspect of the invention there is provided a method of routing telecommunications traffic in a system including an asynchronous transfer mode (ATM) network having uncommitted bandwidth, and a plurality of adaptive grooming routers (AGR) coupled to the ATM network, which AGRs comprise a group adapted to function as a virtual transit exchange whose fabric and control are distributed over the group, the method including determining the current system status whereby to set up narrow band connections across the ATM network based on that status determination.

The technique provides for the separation of call routing and connection control together with the advertising of the system status. This ensures a wide range of scaleability so that the application of dynamic trunking technology provides scaleability in a traffic sense. Further, the separation of call routing and connection control provides a distributed computing environment which is scaleable and managed by this advertisement resource. Because the distributed exchange manages its own internal traffic, effectively it provides means for balancing that traffic to the fabric and makes its own internal routing decisions.

Reference is here directed to our co-pending United Kingdom patent applications Nos. 9410294.4, 9410295.1, 9411944.0 and 9502552.4 which relate to arrangements and methods for handling narrow band traffic in an ATM communications network.

BRIEF DESCRIPTION OF THE DRAWINGS

Embodiments of the invention will now be described with reference to the accompanying drawings in which.

DESCRIPTION OF PREFERRED EMBODIMENT

Figure 1:
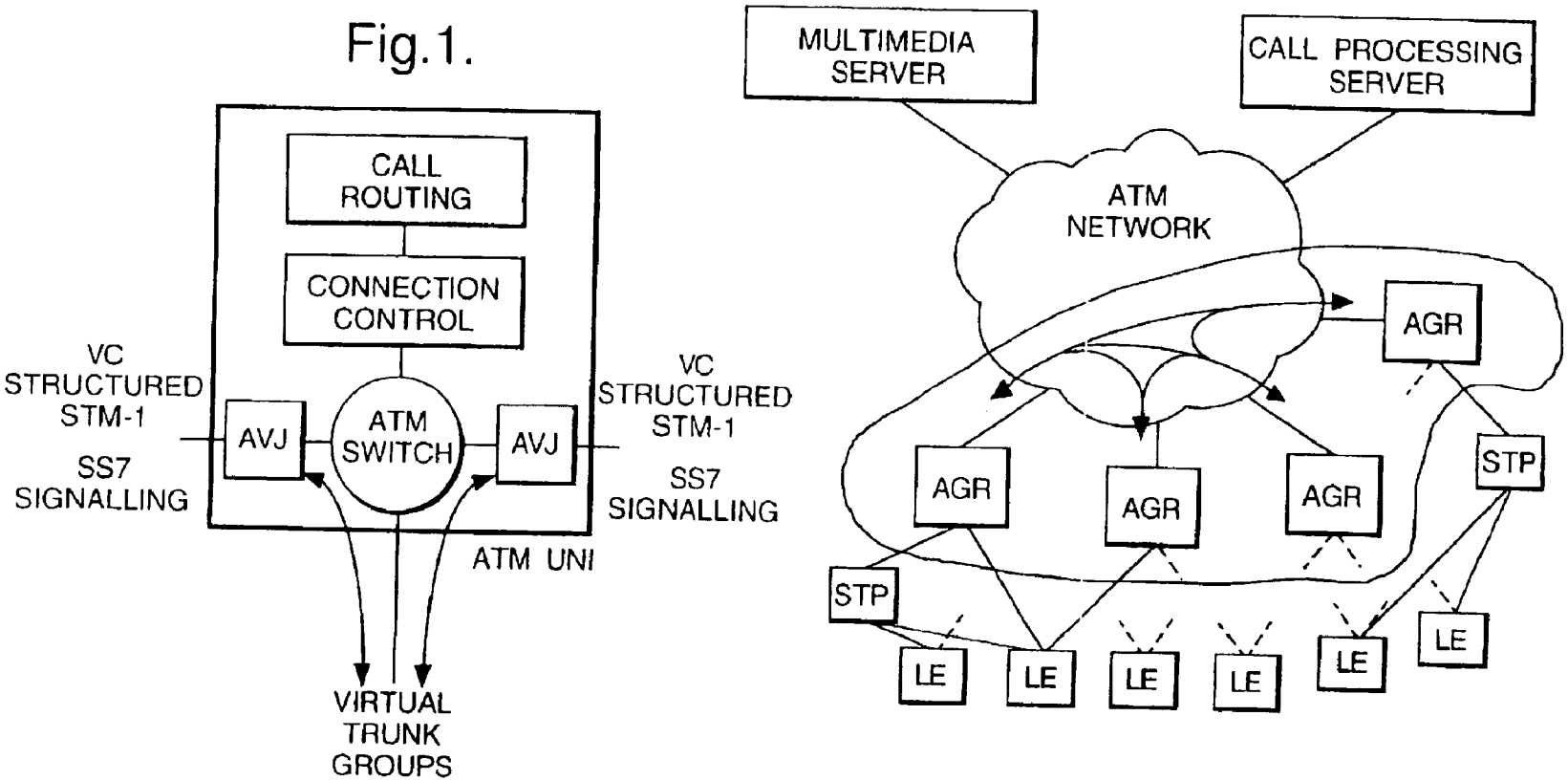
FIG. 1 illustrates an AGR network system that is the preferred embodiment of a large distributed exchange system.

Referring first to FIG. 1, this depicts the functional architecture of the Adaptive Grooming Router (AGR) network system. The AGR works on the principle of a single fabric switch (SFS) incorporating a novel device an adaptive virtual junctor (AVJ), that adapts narrow-band traffic to and from the ATM adaptation layer e.g. (AAL-1), and also provides the means to time switch narrow-band channels. Using a standard ATM switching fabric, the AVJ allows a fully scalable narrow-band exchange to be built, by communicating through the switch fabric using a fully interconnected mesh of dynamically sized trunk groups or virtual channel junctors (VCJ), which gives a non-blocking space switching performance. The AGR extends the scale of this principle to the wide area by using dynamically sized Virtual Trunk Groups VTGs to construct a fully interconnected mesh of AGRs that can dynamically adapt to the community-of-interest in the wide area network. The network of AGRs is termed an AGR network system, and functions as a large distributed narrow-band exchange, that at a minimum can replace a single transit exchange, and at a maximum replace the existing trunk/transit layers of an hierarchical narrow-band exchange network. The term Adaptive Grooming Router (AGR) is used since the node grooms traffic to/from local exchanges according to instantaneous demand for a trunk/transit connection. The VCJs and VTGs function on the principle of dynamic structured data transfer (DSDT) to provide a end-to-end narrow-band connection capability, and the ability to perform path tracing.

The capacity of a single AGR node is dependent on the size of the host ATM switch, the number of connected AVJ devices and the capacity of the AVJ device itself. Further, the AVJ device can be dedicated to perform either a trunking function (termination of synchronous narrow-band circuits) or a grooming function (generation of traffic groups for transmission across the WAN) equivalent to a tandem switching function of NB networks. Therefore both the overall capacity of the node and the mix of traffic (intra and inter node) can be dimensioned according to need. For example, consider a node built using 8,000 channel AVJ devices, hosted to a 10 Gb/s ATM switch. A total of 11 fully interconnected AVJ devices with four dedicated to trunking and 7 to grooming yields node with a total of 70,000 circuits (32,000 TDM trunks and 28,000 WAN trunks). In this configuration the node can terminate up to 28,000 Erlangs of traffic from the synchronous local exchange network with over 80% of this traffic capable of being carried across the WAN. If however, the amount of WAN traffic is less, then one or more of the grooming AVJ devices could be sacrificed for a further trunking AVJ thus increasing the amount of synchronous trunking capacity.

For AGR network resilience, a minimum of two VTGs will interconnect all of the nodes within a network. The capacity of the routes can be dimensioned according to the communication demand—high capacity VTGs connecting high traffic routes, 47 trunks and up and low capacity VTGs connecting low demand routes 6–46 trunks. In this manner the overall grooming capacity of a node can be flexibly dimensioned to connect to either a very large number of nodes (with modest traffic on each route) or to a lower number of nodes (but with a large amount of inter-nodal traffic or a mix of both. As an example, consider the node described above, with 28,000 inter-nodal trunks. In one configuration this could support 178 similar nodes each node interconnected by two VTGs with an average capacity of 80 trunks (the capacities of the individual VTGs can of course dynamically increase and decrease according to demand). In this manner a network capacity of over 5,000,000 narrow-band trunks can be supported with over 80% of this traffic able to traverse the WAN at any one time.

FIG. 1 also shows the manner in which the AGR node provides e.g. N-ISDN SS7 signalling capability and call routing.

Figure 2:
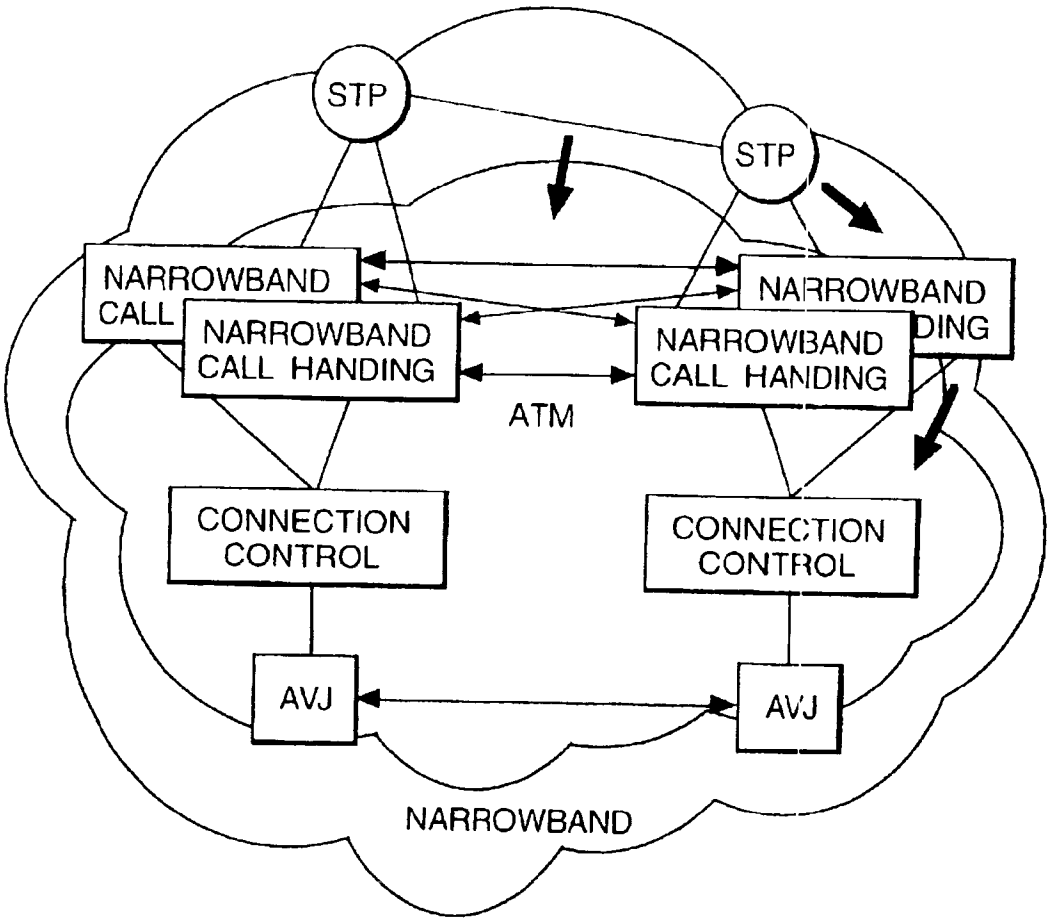
FIG. 2 illustrates signalling separation in the network of FIG. 1.

The arrangement provides a means for establishing, maintaining and removing connections in an AGR network. The AGR network system is controlled from a proxy call routing server in an ATM network to provide new services to users in the network, stemming directly from the aforementioned separation of call routing from connection control which is illustrated in FIG. 2 which illustrates the manner in which adaptating signalling physical layers to ATM allows evolution from STP based signalling to signalling as an ATM network service.

Figure 3:
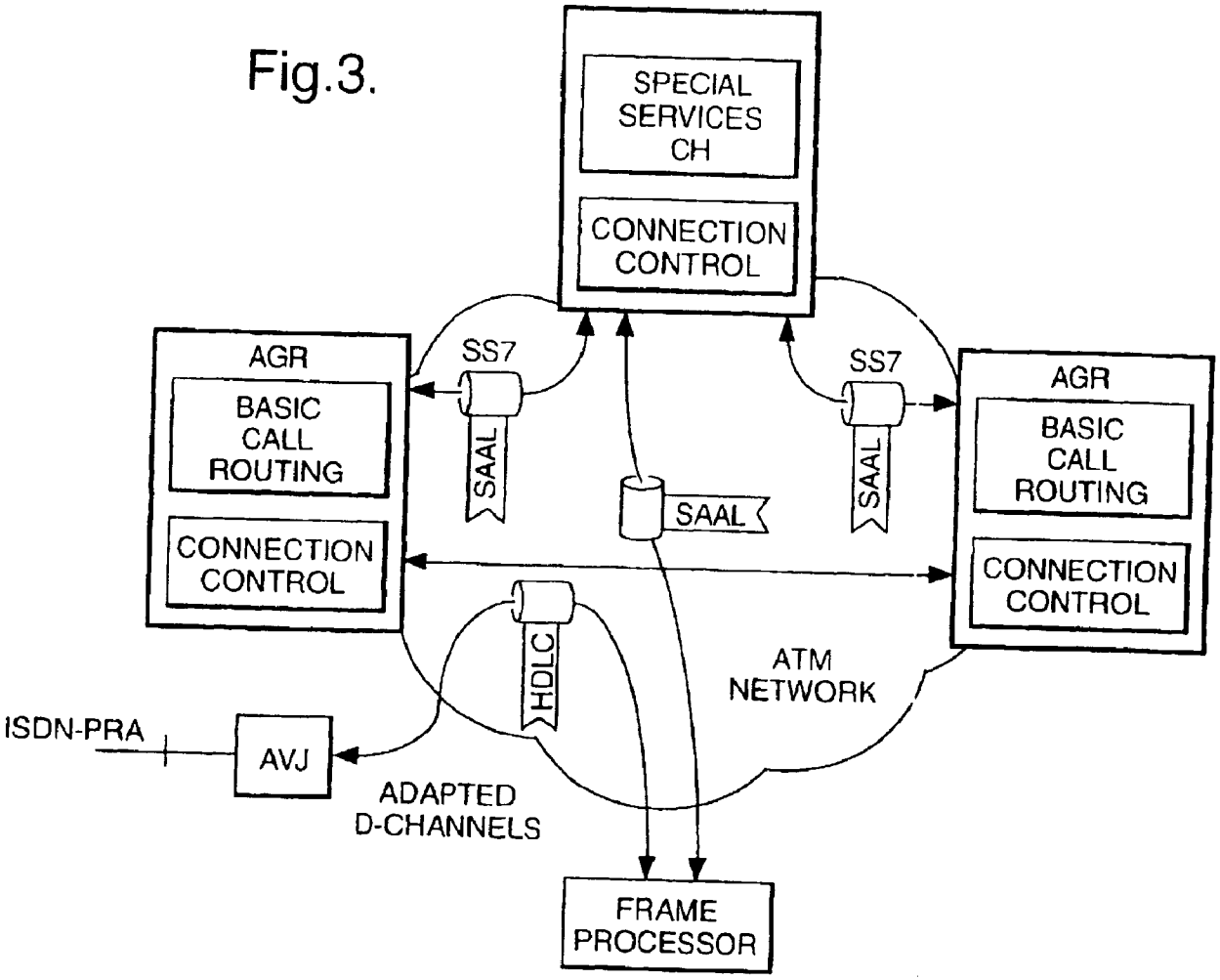
FIG. 3 illustrates the provision of advanced services in the network of FIG. 1.

FIG. 3 illustrates the principle of an AGRNS that provides a connection engine, controlling narrow-band connections between endpoints specified by the local Call Routing subsystem, or by a proxy server. Therefore the proxy server may implement signalling systems that go beyond the capabilities of the N-ISDN SS7 signalling subsystem in the AGR node, and provide for example multimedia services and control the point-to-multipoint hardware capability of the AGR. In the example illustrated, the D channels of ISDN Primary Rate Access are routed to a frame processor located in the ATM network, accessed by a Virtual Channel Connection. The frame processor takes HDLC frames and adapts them to/from AAL-5. The D channels may carry HDLC frames that are adapted to the broadband MTP-2 protocol Signalling ATM Adaptation Layer (SAAL) and then routed to the proxy server. The HDLC frames may contain any layer 3 or higher layer of the OSI model as signalling messages for direct interpretation by the software within the proxy server. These messages are translated into commands that use the Applications Interface of the connection control of the AGR node or are formed into SS7 messages or any other suitable proxy signalling protocol that can be interpreted by the Connection Control layer of the AGR software to instruct it to control narrow-band connections between specified endpoints. By separating the service aspect from the connection aspect in this manner, new services may be made available in the network.

Figure 4:
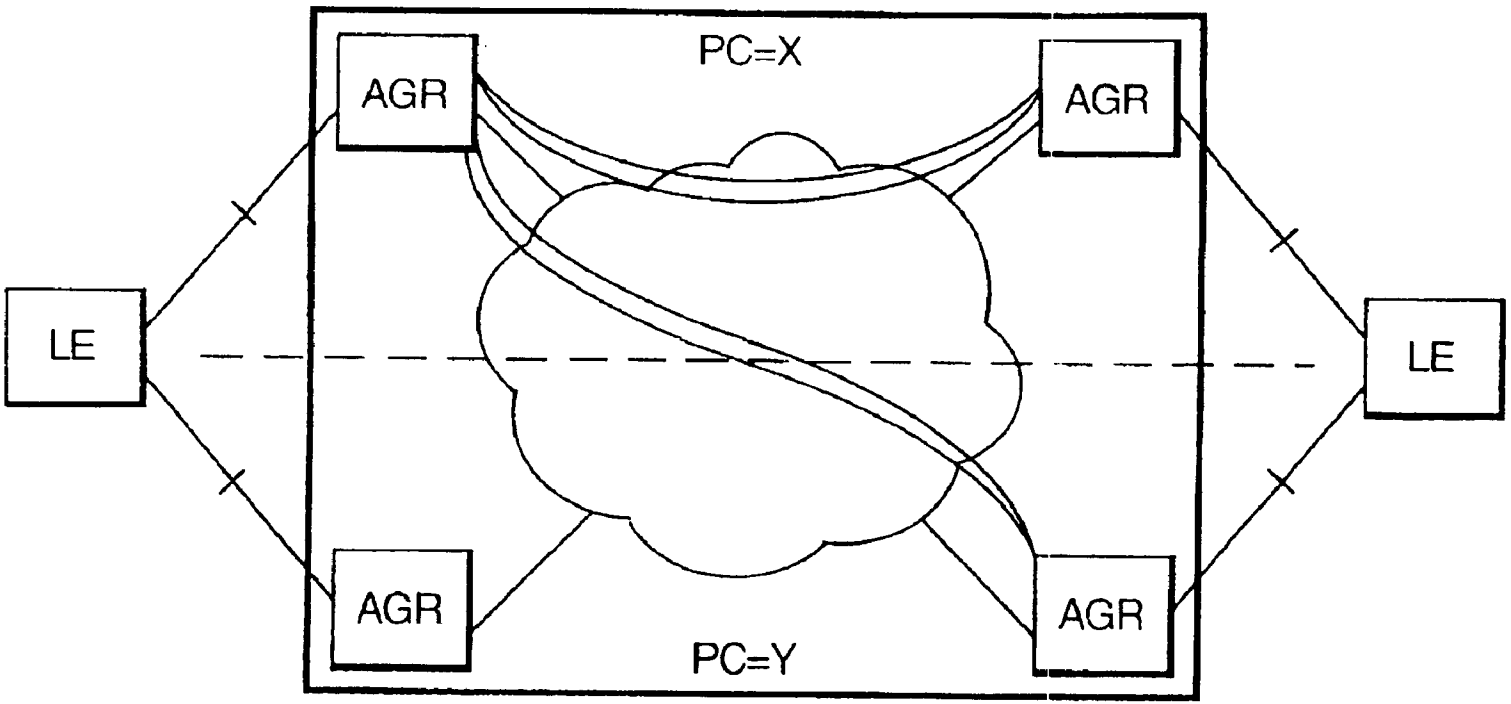
FIG. 4 illustrates the principle of dual homing and diverse path routing external narrow-band exchanges to the distributed exchange system.

Referring now to FIG. 4, this illustrates the principle of dual homing of narrow-band exchanges to the AGR network system. In hierarchical narrow-band transit networks, a local exchange in the lowest tier must prioritise its traffic across many small routes depending on geographical destination of a call and traffic congestion levels. Since the AGR network system performs a grooming and dynamic handling of traffic demand, the local exchange can now simply "hook on" to the AGR network system using a large voice route. The large voice route has increased Erlang efficiency, and providing two large voice routes provides a degree of resilience if the traffic is balanced across the two routes. The AGR network system can also make use of the dual homing facility to balance traffic internally, since there is a choice of destination AGR when communicating with any dual homed narrow-band local exchange.

Figure 5:
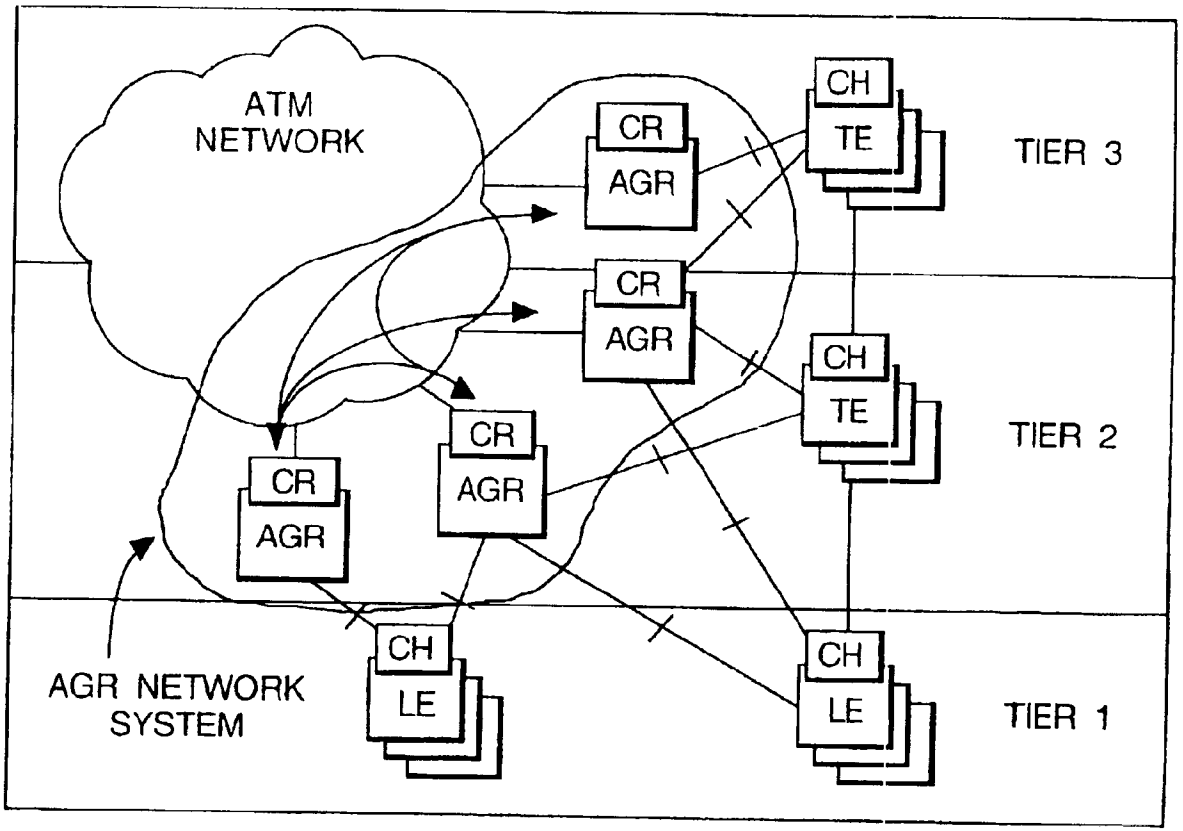
FIG. 5 illustrates the connection of the large distributed exchange to a hierarchy of narrow-band exchanges.

FIG. 5 illustrates the connection of the AGRNS into an existing narrow-band network hierarchy of exchanges. In such a narrow-band network it is traditional to provision the network to have a choice of routes with priority given to the most direct route between exchanges. However the routes will be sized such that they experience a differing degree of blocking probability that decreases with decreasing priority, such that a backbone route via exchanges in the highest tier has a much lower blocking probability than routes directly between local exchanges. The AGRNS may be deployed to replace just one such exchange in tiers 2 or 3, or to provide a backbone narrow-band network using ATM transport that could replace part or all of the narrow-band transport and exchanges. This would ultimately form a single tier transit network. Consequently, the AGRNS must in general be able to cope with the prioritisation of voice routes that connect it to the narrow-band transit hierarchy. These voice routes would suffer congestion because of occupancy and also exchange processor activity, as described in the ITU White Book Standards on SS7. Internally the AGRNS must cope with the shared utilisation of the ATM transport and with the blocking caused by fragmenting its grooming capacity across a number of physical devices. The load balancing arrangement shown in FIG. 5 exploits the dual or multi-homed connectivity in the narrow-band network to even out traffic occupancy on external voice routes and internal trunk groups so as delay the onset of congestion and maintain carried traffic levels under overload conditions by rejecting offered traffic at the periphery of the AGRNS.

Figure 6:
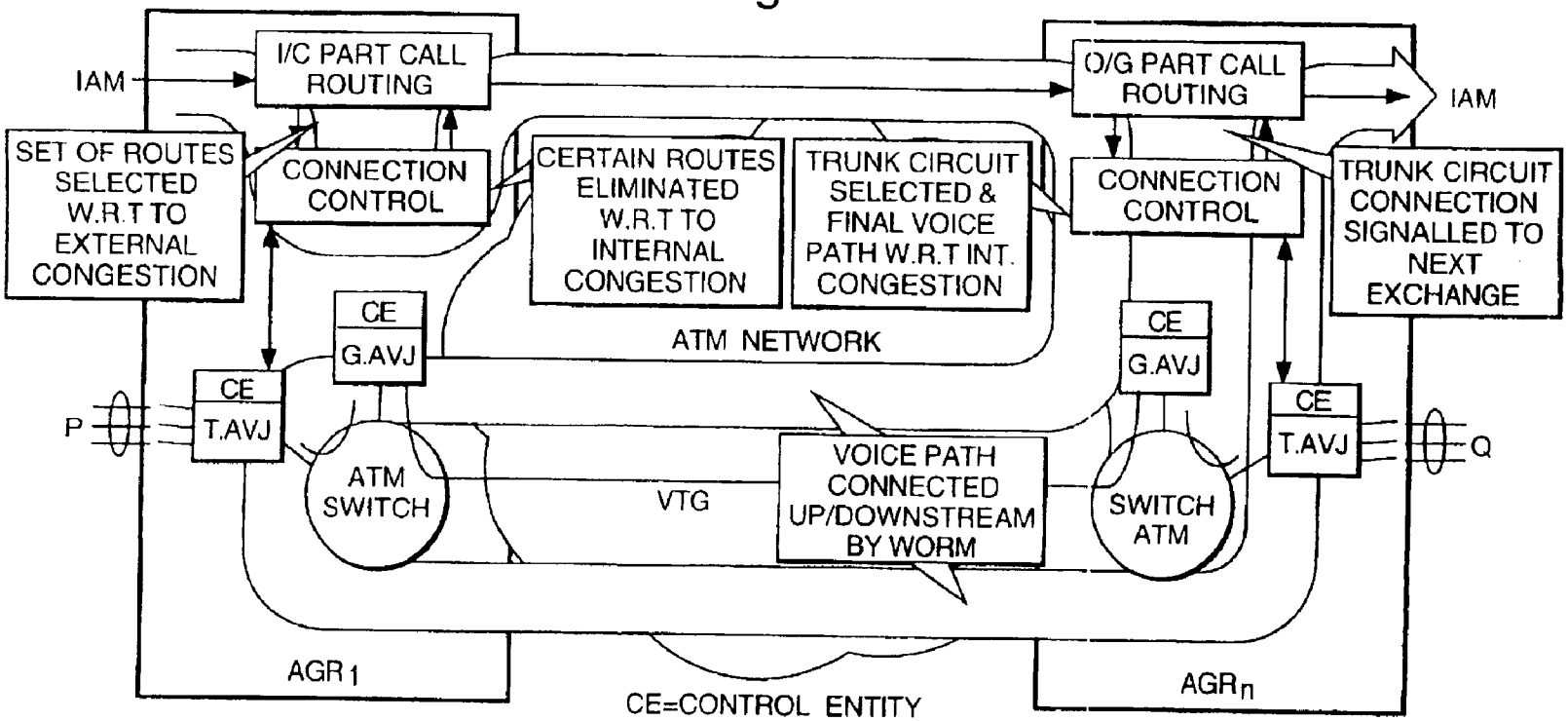
FIG. 6 illustrates an overview of handling a connection set-up request and the roles of call routing, connection control and voice-path connection termed wormholes.

Reference is now made FIGS. 6 to 20 which illustrate stages of the connection set up in the network of FIG. 1 in response to a set up request. The diagram of FIG. 6 shows two separate functions, call routing and connection control. FIG. 6 also shows the stages of progression of the call. The incoming initial address message (IAM), which may comprise the initial address message of the number 7 signalling system, goes to call routing which makes decisions based on a digit analysis by using as many digits as it needs to determine the outgoing voice route or set of voice routes in the narrow-band network (see FIG. 2b) and it may, if necessary, wait for other signalling messages. Once call routing has chosen the candidate set of voice routes it can then make decisions based on static prioritisation of those voice routes. I.e. a voice route through a local exchange can be used in preference to one through a transit exchange, which preferably is used less often. The call routing then makes an assessment of congestion on those voice routes. This could either be a total circuit occupancy of the voice route or it could be congestion associated with an exchange and the processing power it has available to handle signalling messages, e.g. in accordance with ITU standards on SS7. It will be appreciated that congestion can arise both from excess voice route utilisation which is using up circuits in those voice routes and from exchange loading which is a congestion indication which is exchange specific but not necessarily associated with the voice route which is to go between the AGR network system and the exchange.

Connection control is responsible for ensuring that a connection can be made between the end points P and Q through the AGR network system. Messages can be passed from call routing (CR) to connection control (CC) which can then eliminate routes with respect to internal congestion, or may be continually passed from connection control to CR such that call routing may eliminate candidate routes in priority order. Internal congestion can be due to having to share the ATM network with other types of traffic so that voice traffic demands have to compete with other demands for the same resources, and also because inherently in the design of the AGR there is a fragmentation of resources in the physical devices. Whilst there may be a certain amount of capacity available on a pooled resource, it may in fact be fragmented over a number of physical devices and therefore steps should be taken to balance the load between the physical devices. It is possible to arrive at a situation where the carrying capacity is much less than the design capacity because this capacity cannot be accessed fully as a result of fragmentation. In such circumstances connection control eliminates the corresponding route and then passes the message back to call routing for forwarding to a destination AGR.

Thus, the destination AGR choice is based on the highest priority accessible, reachable, voice route which immediately identifies the AGR from which that voice route emanates so from that point on signalling messages are forwarded to the outgoing (OG) call routing on the other side of the network. At that stage the outgoing Call Routing is responsible for determining whether it can make a particular trunk circuit selection. A voice route consists of many trunk circuits, so call routing has to deal with the possible race conditions of incoming signalling on that side which may want to select the same voice circuit, because they are both way circuits, from that same voice route. There may be various circuit selection policies. Call routing monitors the progress of those signals and will then perform the final selection of the trunk circuit in that given voice route with respect to whether there is a race condition, which is termed glare, and also taking into account whether certain circuits are out of service, not provisioned, or the type of call, e.g. whether it is a test call. Once the circuit has been selected, call routing passes this information to connection control and begins the third stage of the process to actually connect the voice path between the end points P and Q, either in a unidirectional or bidirectional manner in the network system, this being referred to as a worm which is a specification of the nodes that the voice path will pass through. The content of the worm specifies the connection of the circuit at each stage of the connection in turn from trunking AVJ to grooming AVJ and back from grooming AVJ to trunking AVJ in the other remote AGR. Essentially the mechanism is driven by the worm being passed forward in a chain and then passed back as a form of acknowledgement. Once it has reached the outgoing stage again then the trunking AVJ responsible passes it to connection control which passes out a message to Call Routing which can then send out the outgoing IAM signal. This illustration of the worm is in fact a main path which shows the whole passage of a call set up. The call handling that is encompassed on the AGR has taken into account external and internal congestion. When the call routing is a proxy call routing, i.e. the AGR were just providing a connection entity, it is connection control's responsibility to handle internal congestion, and the particular form of call routing or special services would take into account their own means of determining external congestion, for the signalling scheme in use, and the handshake between Call Routing and connection control and the selection of the outgoing voice route applies equally to these proxy servers.

Figure 7:
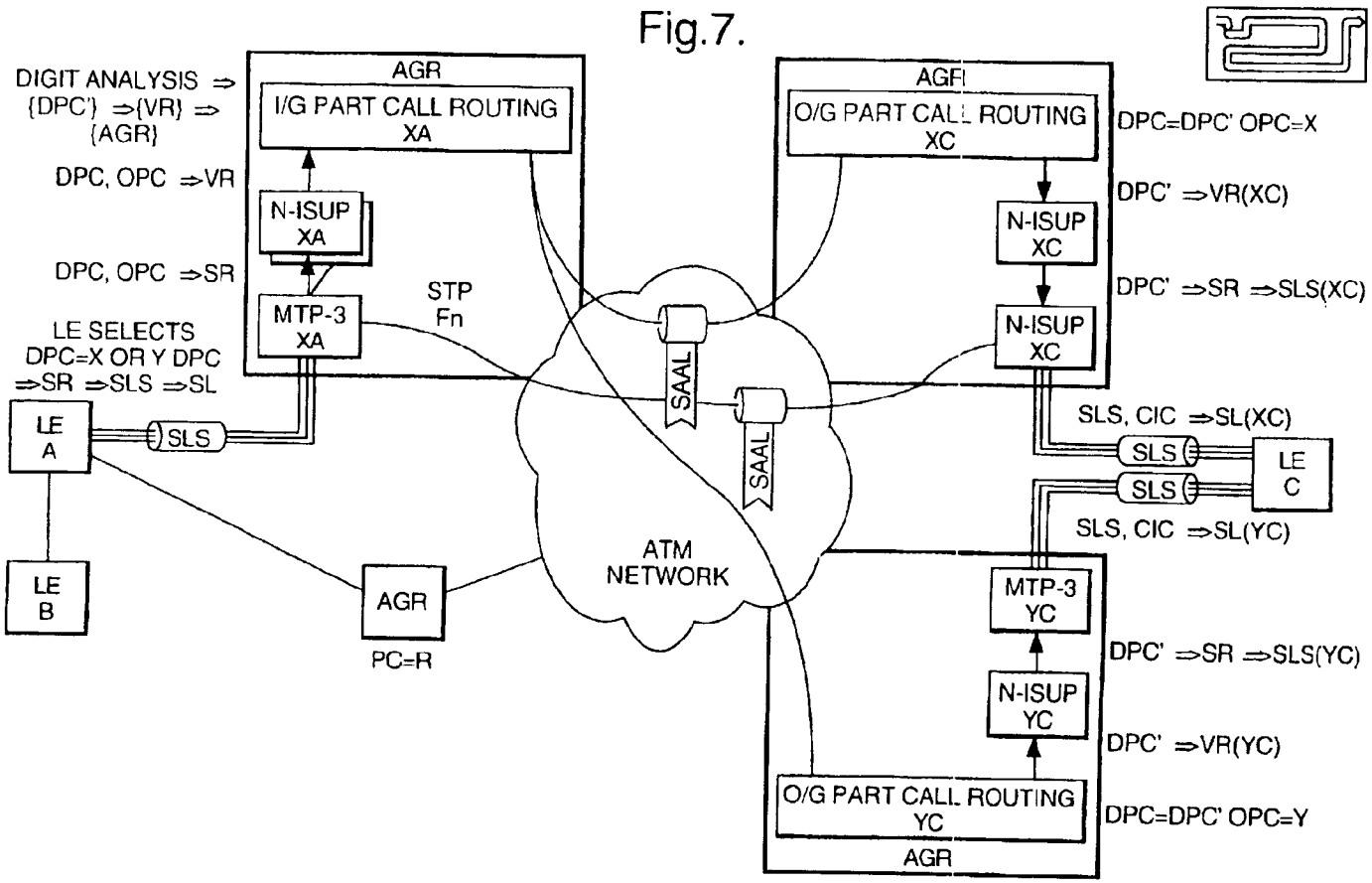
FIG. 7 illustrates the principle of using existing N-ISUP signalling as the means for routing calls across the distributed exchange system at the Call Routing layer.

FIG. 7 shows how the existing SS7 signalling scheme can be used to signal messages to and from the AGR network system. In FIG. 7, local exchange LEA is a local exchange but it is also providing a signalling transfer point for local exchange LEB, so that local exchange LEB signals its messages through local exchange LEA. The AGR network system consists of AGRs 41 to 44, one of which (41) is the incoming AGR.

Outgoing AGRs are illustrated just to illustrate a means for balancing traffic load to local exchange LEC which happens to be dual homed onto these two outgoing AGRs. The local exchange LEA can select a destination point code. The LEA when it has performed digit analysis on the call derives a destination point codes (DPC) and from the destination point code derives particular signalling route and then a particular signalling link set and a particular signalling link to reach the AGR system layer MTP-3 (Message Transfer Part 3) whereby to determine whether the messages are indeed for this AGR, which from the DPC determines whether the messages are being forwarded to another exchange, either in the AGR system, or external to the AGR system, or whether they have in fact been routed incorrectly. From the destination point code and the originating point code, the MPT-3 can tell whether to handle this message internally, which is passed to the narrow band ISDN User Part (NIS UP), and determines whether the message came from local exchange LEB or from local exchange LEA, in which case it may be handled accordingly, or whether the destination point code differs from the AGR in this case, LEC, in which case there is an STP function whereby messages are forwarded to MTP3 in one of the outgoing AGRs using SAAL which is the broadband signalling ATM adaptation layer. If the destination point code and originating point code imply a signalling route, the message is passed to N-ISUP, which from the destination point code and the originating point code associates that signalling route with a particular incoming voice route, and the CR entity that takes the signalling messages and, by digit analysis, determines the possible set of destination point codes, i.e. the point code implies a possible set of outgoing voice routes that connect between the AGR network system and destination NB exchanges which therefore implies a possible set of outgoing AGRs which head-up those voice routes. Once a choice of voice route has been made with due consideration to load balancing, internal congestion, to determine which is the outgoing AGR, a similar scheme from Call Routing down through N-ISUP down to MTP3 signals the outgoing exchange, for example the local exchange LEC. Thus, the destination point code of the AGR is now replaced with the destination point code of exchange LEC, the originating point code is now replaced with that of the AGR network system rather than exchange LEA or LEB. The destination point code, will imply a particular voice route between that originating point code and the new destination point code, local exchange LEC which would imply a particular signalling route and therefore a particular signalling link set.

Figure 8:
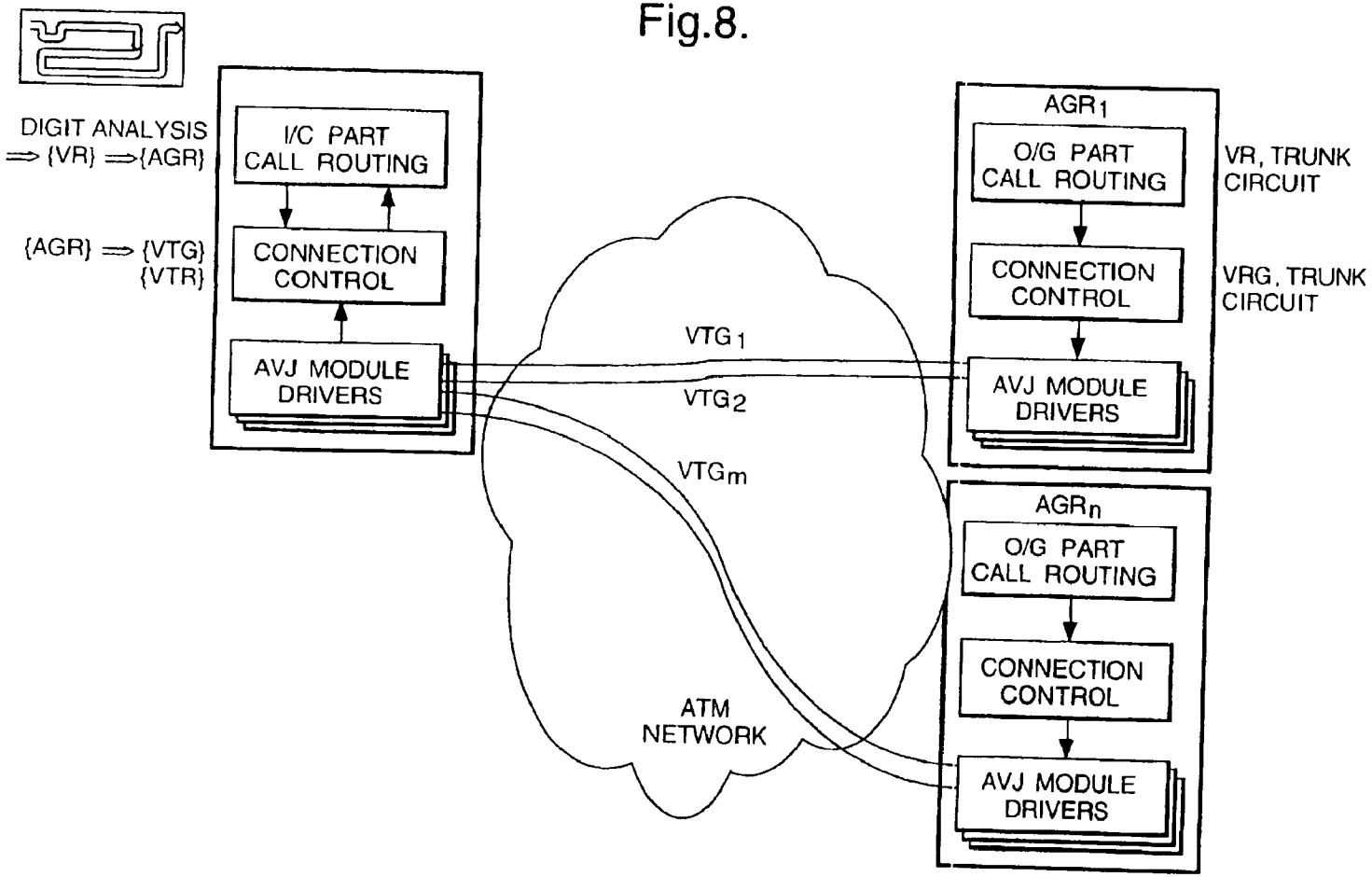
FIG. 8 illustrates the principle of controlling routing and congestion in the Call Routing and Connection Control layers.

Referring now to FIG. 8, this illustrates the way in which call routing prioritises voice routes statically or dynamically according to network congestion statistics. Statically means a static prioritisation of route according to the three tier network where there is a first priority, a second priority and so on, or joint first priority, and dynamically means the use of more advanced algorithms such as dynamic call routing algorithms.

Call routing passes the set of potential destination AGRs to Connection Control. Connection Control is aware of the topology of the AGR network system, which AGRs are connected together by virtual trunk groups. There may be more than one virtual trunk group (VTG) between any given pair of AGRs. Therefore there is a choice for load balancing between VTGs, but combined with the candidate set of AGRs there could be more than one VTG to choose from overall. Connection control maps the set of AGRs onto the set of candidate VTGs which are carried in virtual paths in the ATM sense, referred to as virtual trunk routes, and connection control can establish from the set of VTGs those voice routes which are not reachable due to internal congestion. By knowing the capacity available on the VTGs, because these are dynamically sized, connection control knows from congestion criteria whether it can dilate any particular VTG and what the greatest likelihood of success will be for any given choice. This provides a tacility to block routes which are unreachable in the network at the outset. By rejecting calls with as small amount of processing as possible then, when the system is heavily overloaded there is reduced processing and signalling generated for calls which can not currentlby be established across the network. By providing this essentially negative feedback scheme, a call can be rejected at the periphery of the AGR network before an abortive attempt to route the call across the network and thus a high degree of carried traffic can be maintained. Connection control does not necessarily know the prioritisation of voice routes, but it will eliminate those voice routes which are not reachable without actually changing the priority and therefore it can achieve a load balancing capability with voice routes which are of equal priority or may have changed their dynamic priority from the call routing perspective. Call routing can thus select one given route which has a high degree or certainty of success and therefore need be only indirectly aware of the internal resource availability.

Figure 9:
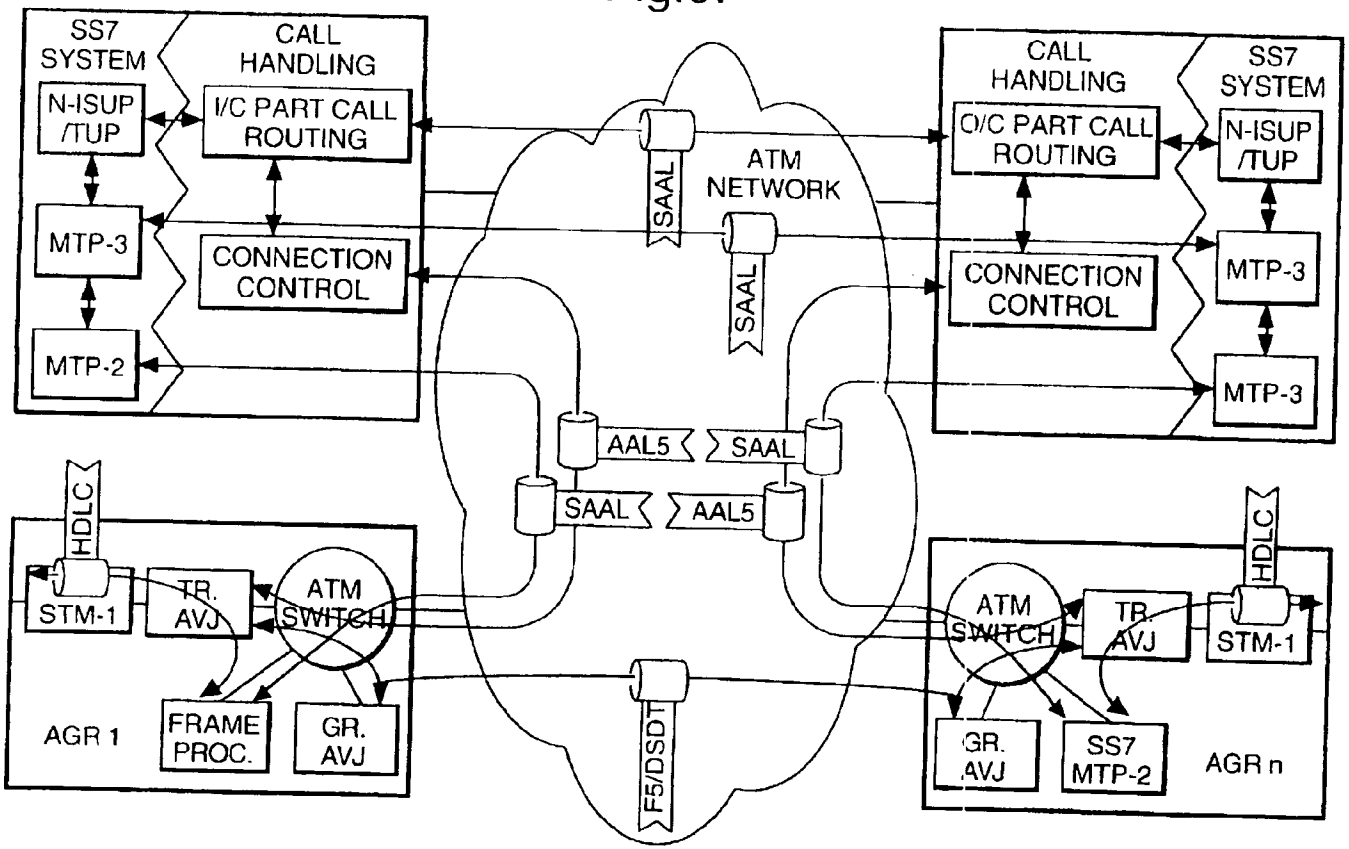
FIG. 9 shows a AGR protocol stack for the network of FIG. 1.

A preferred AGR connection protocol stack is illustrated by way of example in FIG. 9.

Figure 10:
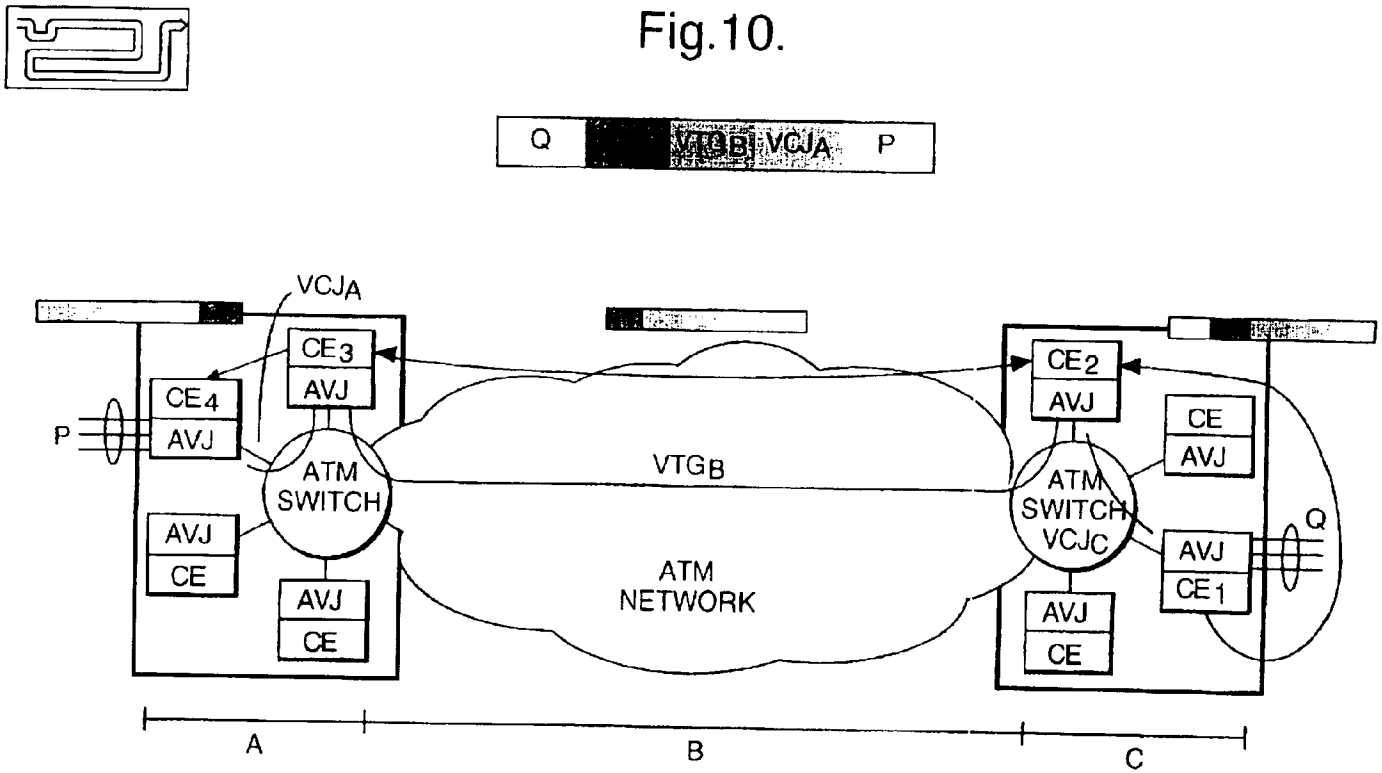
FIG. 10 illustrates a means for specifying a speech path across the distributed exchange system.

FIG. 10 shows the final stage of the path set up process at which, having selected the outgoing circuit, with knowledge of the incoming circuit, the voice path is now to be set up therebetween. Because the AGRs have fixed topology, they have an inter-AGR stage which is shown in zone B in this figure. This is the VTG the virtual trunk group and intra-AGR which is the Virtual Channel Junctor VCJ, which is for most purposes identical to the VTG and works on substantially identical principles. In this ATM based domain it is necessary to connect from the trunking AVJs, which interface with trunk circuits directly to intermediate stages which are called grooming AVJs because they groom traffic from and to the wide area (the inter-AGR traffic) and finally to the trunking AVJ which is associated with circuit P. The worm thus contains five identifying features which are illustrated here as being, the outgoing circuit Q, the next stage which identifies a grooming AVJ that will connect us to our chosen VTG, which therefore implies a particular VCJ, the VTG chosen by Connection Control and the VCJ which will take us to the trunking AVJ which interfaces directly with circuit P. By passing this worm forward from controllers built into the AVJ, they can each set up their connection maps to ensure that there is a voice path continuously from circuit P to circuit Q in either a unidirectional or a bidirectional scheme and that could form a forward or a reverse voice path. Passing the worm to and fro to one end and then back is a ready form of acknowledgement of the signalling scheme.

Figure 11:
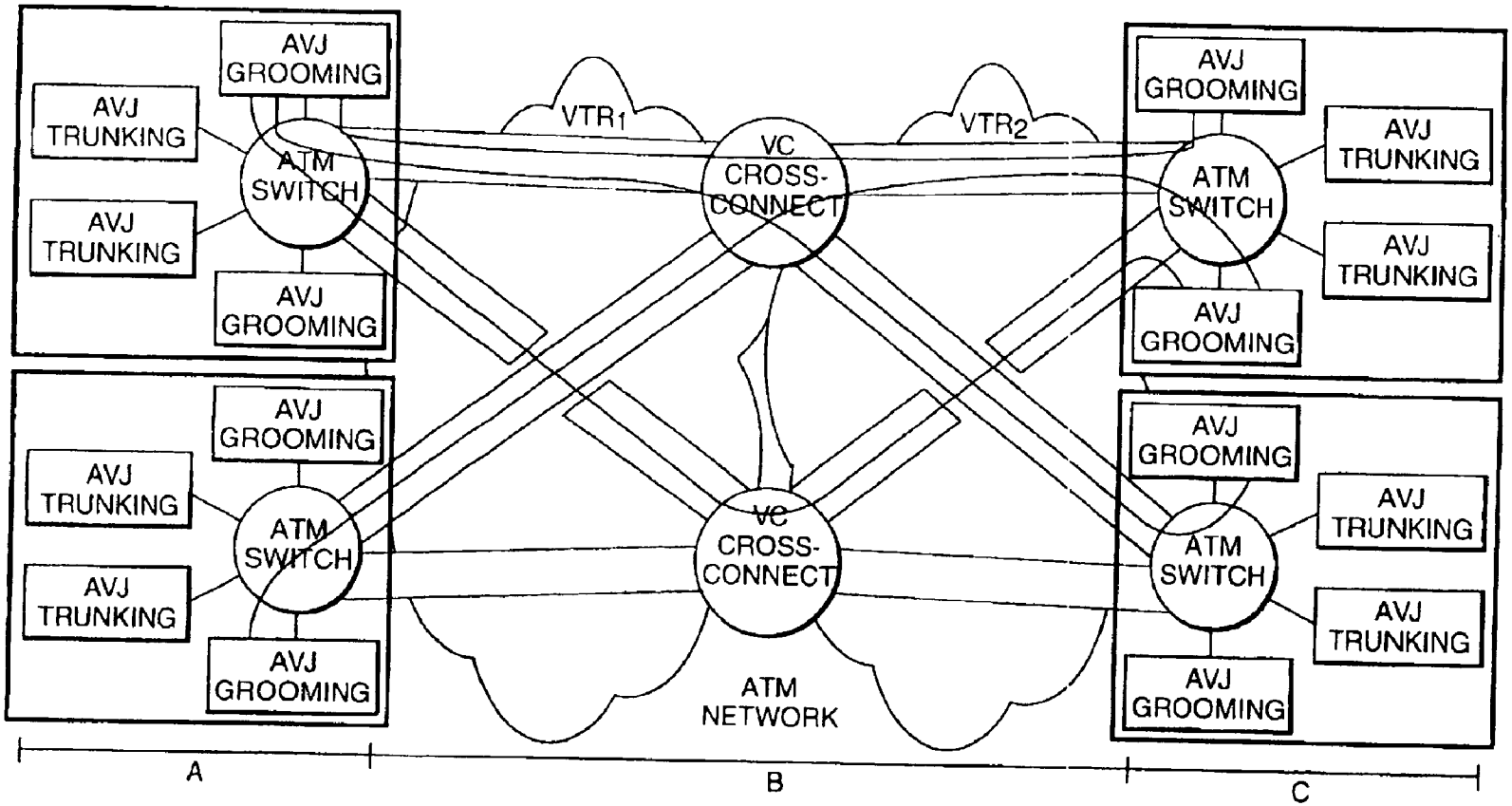
FIG. 11 illustrates the functional topology of the physically distributed exchange system.

FIG. 11 illustrates the functional topology of the system and shows a method for achieving both load balancing through a number different routes between AGRs and also for providing physically diverse routes for resilience purposes. Each AGR consists of trunking AVJs, and grooming AVJs which interface to a wide area network which has an ATM switch. This is a non-blocking ATM switch described earlier. Any local traffic in an AGR would simply be passed between its trunking AVJs. Any wide area network would be passed to a grooming AVJ for grooming on to a VTG. To achieve physically diverse paths one must ensure that those paths pass through a minimum of at least two switches in the ATM network. These switches are the two VC cross-connects shown and since a VTG is a virtual channel connection, it can be cross-connected at the VC level and by ensuring the ability to connect between any pair of AGRs by passing through at least two VC cross-connects in the network ensures a physically diverse path because the cross-connects must be distinct, and therefore use distinct ports, and therefore there is no single point of failure on those routes. In the path between an AGR and a cross-connect there is a virtual trunk route (VTR) which in ATM terms is a virtual path. A VTR can pass through any number of intermediate switches in the ATM network functioning as virtual path cross-connects which have not been shown for clarity, but logically it is a path from AGR to VC cross-connect and whatever bandwidth is associated with the virtual trunk route as it emanates from the AGR is identical to the capacity it has arrives at the virtual cross-connect. Thus each VTG and its potentially physically diverse pair is contained in at most two VTRs between any two AGRS. Thus an AGR can determine in its local section of VTR1 to the left hand side, VTR2 to the right hand side, what capacity has been negotiated with the ATM network, and what the available bandwidth is currently for calls in progress. VTGs are carried within virtual trunk routes and a virtual trunk route can comprise a number of VTGs, which are segregated at and multiplexed at the VC cross-connect, hence the utilisation of VTR1 is not necessarily the capacity of VTR2, there being no necessary association. AGR.1 is aware of the capacity and utilisation of VTR1 on the left hand side, and the AGR2 on the right hand side knows the capacity and utilisation VTR2 then the end to end capacity and utilisation is known through the ATM network, whatever the number of intermediate switching stages, and there is no isolated section whose capacity and utilisation could not be determined in this manner, hence the AGRNs can determine the congestion level in the network.

Figure 12:
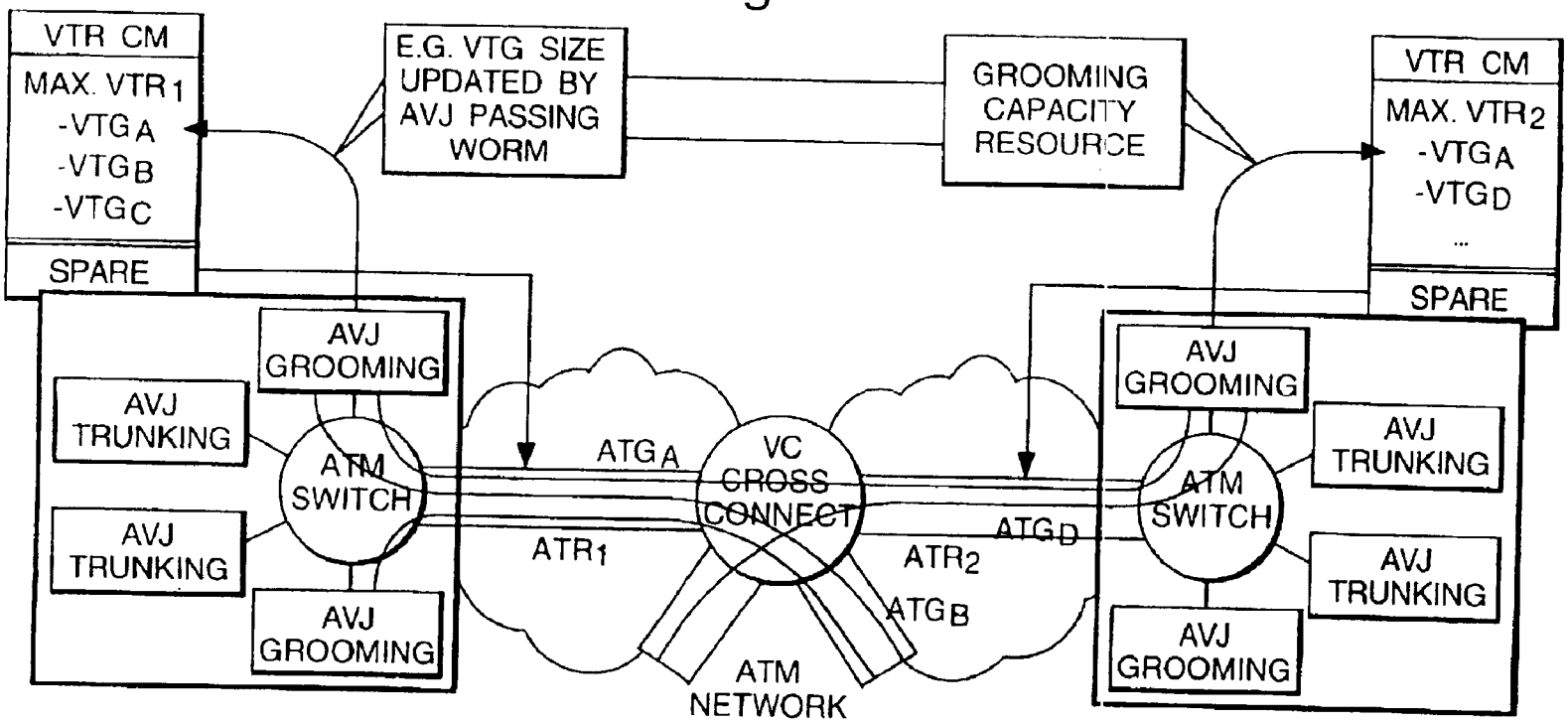
FIG. 12 illustrates an arrangement for determining available trunk capacity on a Virtual Trunk Route (VTR)

Referring now to FIG. 12, this shows a method of determining the spare capacity on a virtual trunk route. The virtual trunk route statistics are processed by a VTR capacity monitor which retains the maximum VTR size which is the bandwidth/capacity negotiated with the ATM network, and the maximum bandwidth that one could use on the route. Some of this bandwidth may be reserved for maintenance purposes, but the rest is devoted to VTG bandwidth. The VTR CU also has information on the VTGs that the VTR comprises and, by subtracting the current absolute sizes of the VTGs from the maximum usable bandwidth of the VTR, results in the spare capacity of the VTR, and whether that route is be congested or not. The VTR CU is ideally located in the Connection Control layer of the AGR control system.

A VTR is a shared resource in the Connection Control, and therefore interrogation for its spare capacity can be single threaded on a call by call basis, providing a ready means to share out the spare capacity. The VTR CU information could be updated every time a call is modified in a VTG; it comprises as a means to reduce signalling, one could have a fixed time interval, for update, between which the VTR CU grants a credit per interval to each VTG it comprises based on that VTG's absolute—and change in utilisation in the previous interval, or any other appropriate scheme is applicable, so in this manner the VTR capacity monitor need not be precise in operation. When the VTR capacity monitor has crossed a certain predefined threshold, and there may be several such thresholds, it flags processed calls a corresponding degree of congestion, and thresholds would be determined according to a desired network performance and efficiency. Bandwidth for VTRs may be decided according to desired network performance and those thresholds can be used as an indication of internal congestion in place of or in conjunction with the absolute spare capacity, the indication of having crossed the threshold may provide a direct means of comparison and suitability between candidate VTRs in routing a call, and as a means for data/signalling compression.

Figure 13:
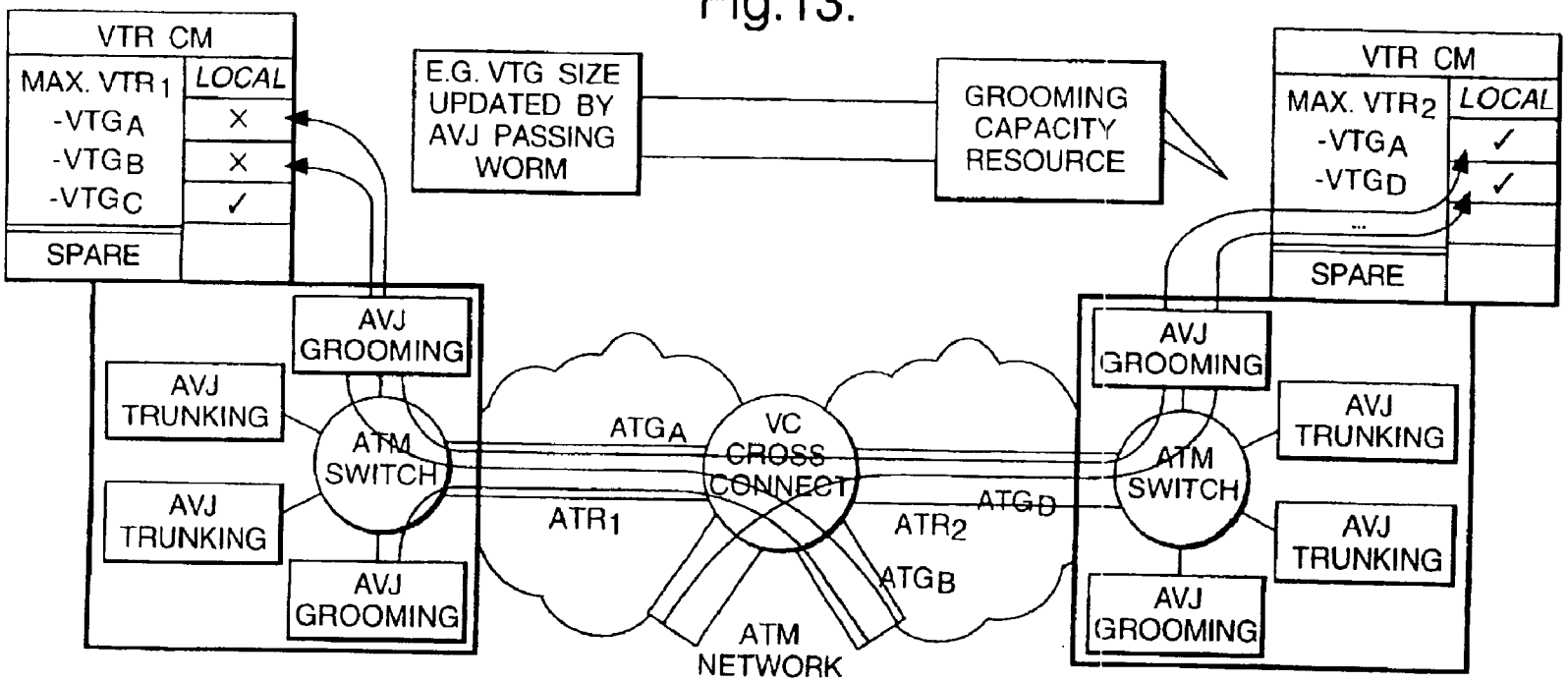
FIG. 13 illustrates an arrangement for determining a Virtual Trunk Group's (VTG) capacity.

FIG. 13 illustrates the provision of grooming capacity information in the AVJ device. Whilst there may be spare capacity on a VTR, the VTGs it comprises could be controlled by distinct physical devices, i.e. grooming AVJs. Consequently whilst there may be spare capacity in the VTR there may no longer be any capacity on a grooming AVJ that controls a VTG of interest, i.e. a VTG that is candidate for end-to-end routing. A grooming AVJ can signal call-by-call or, on occasion, the current sizes of the VTGs that it operates to the respective VTR CUs, such that they know the size of VTGs, but a grooming AVJ can also send its spare grooming capacity resource, and associate that spare resource with the relevant and respective VTGs to which it may apply in unequal measure due to implementation compromises. Thus, the VTR capacity monitor can check the quality of a candidate route to VTG resolution, whether it has crossed a threshold of congestion or whether any of the VTGs have crossed a threshold of congestion by lack of capacity on their grooming AVJ. VTGs may include padding to ensure constant end-to-end delay in the network. When some or all the channels in a given VTG are not used, by specifying some minimum number of channels in a VTG, one ensures maximum end-to-end delay, and if those channels are not used then they are padded, but because they are padded, adding a channel to the VTG would not in fact increase the VTG size, so that capacity extra to the spare grooming AVJ capacity. Under those situations the AVJ grooming spare capacity can be ignored. So now we have a complete picture in the VTR's capacity monitor of any local congestion.

Figure 14:
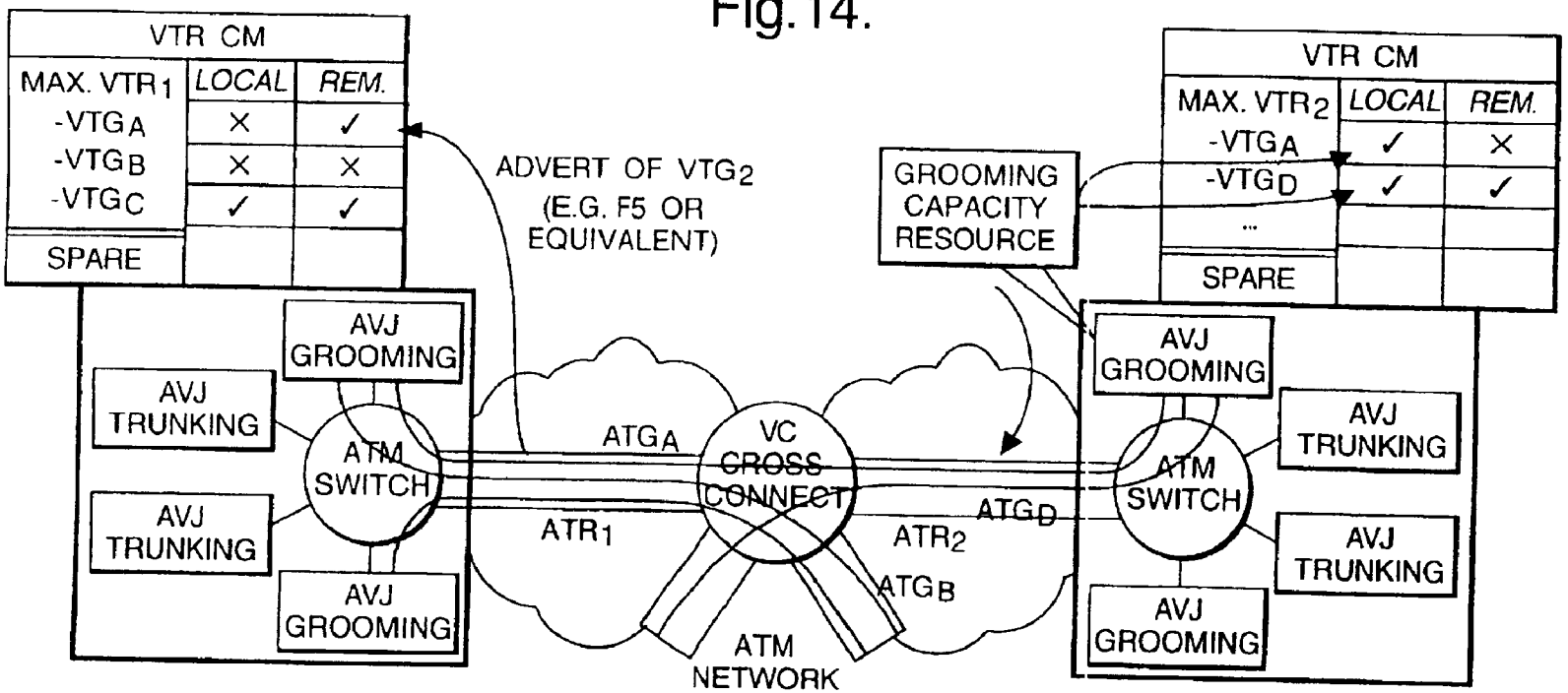
FIG. 14 illustrates an arrangement for advertising congestion on a remote node's VTG in the distributed exchange system.

FIG. 14 illustrates the process of advertising local conditions to the far end through the VTGs, i.e. the AGRs to which a local AGR is connected. Advertising local congestion in terms of crossed thresholds or obsolete utilisation can be done on a relatively infrequent basis and it provides the other end with information of the remote VTR section congestion, because being able to dilate and increase a channel in a VTG at the local end is necessary but not a sufficient means to ensure there is capacity at a remote end. This is a preferred means to ensure to a very high probability that calls will be connected on first attempt by making at the outset a proper assessment of whether a particular AGR is reachable by any given path and therefore reject blocked traffic at source and hence the advantage of no impairment to the amount of carried traffic under overload conditions local or remote or universal.

A VTR capacity monitor can advertise its local congestion status in terms of thresholds or absolute capacity to all or select remote VTR capacity monitors to which it is connected, by VTGs through the VTGs it comprises, by using for example the ATM F5 cell method or any other equivalent signalling scheme which can be associated with a virtual channel connection or VTG. A VTRCU can advertise to all those VTRCUs or to a selection, based on any selection criteria, for example geographical distance or logical hierarchical placement. The VTGs could be given for example a geographic location or, reach or distance indicator, and thereby the congestion could be sent out as an indication to only a local area if the distance is below a certain threshold with an associated congestion threshold, thereby only AGRs within a given geographic locale will get signalled first and as congestion increases then it could spread to the wider AGR network system. One can envisage any scheme of selection criteria for any advantageous purpose, which may be select or universal in application. A VTR capacity monitor obtains remote VTR congestion indication for any VTG that it comprises and with regard to FIG. 10a, congestion indications of remote grooming capacity by identical means and criteria from a remote VTR CU or remote grooming AVJ, for any VTG it comprises, and it can supply Connection Control an overall preference by applying any type of weighted cost function to the local and remote congestion indicators and Connection Control can decide thereby the best routing policy with relatively up-to-date local information and relatively out-of-date advertised remote information prior to making any call connection, to select a reachable voice route and then forwarding the signalling remote AGR where its Connection Control may re-examine the best VTG route from the remote perspective, where it will have an up-to-date picture of its own congestion and a relatively up-to-date picture of the emanating AGR at the local end and a more up-to-date picture at the point when the final selection of VTG is made to send the worm back across the network to complete the voice path connection.

Figure 15:
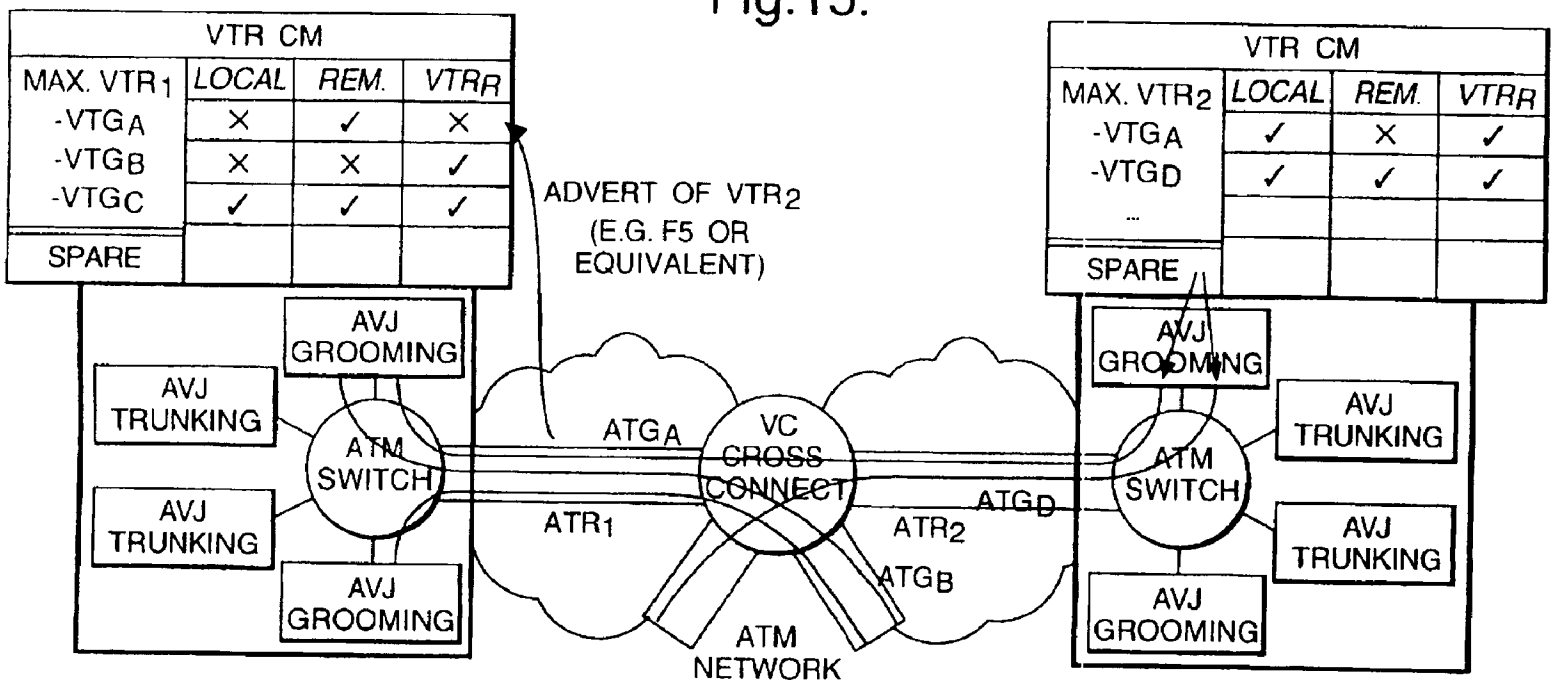
FIG. 15 illustrates an arrangement for advertising congestion on a remote node's VTR in the distributed exchange system.
Figure 16:
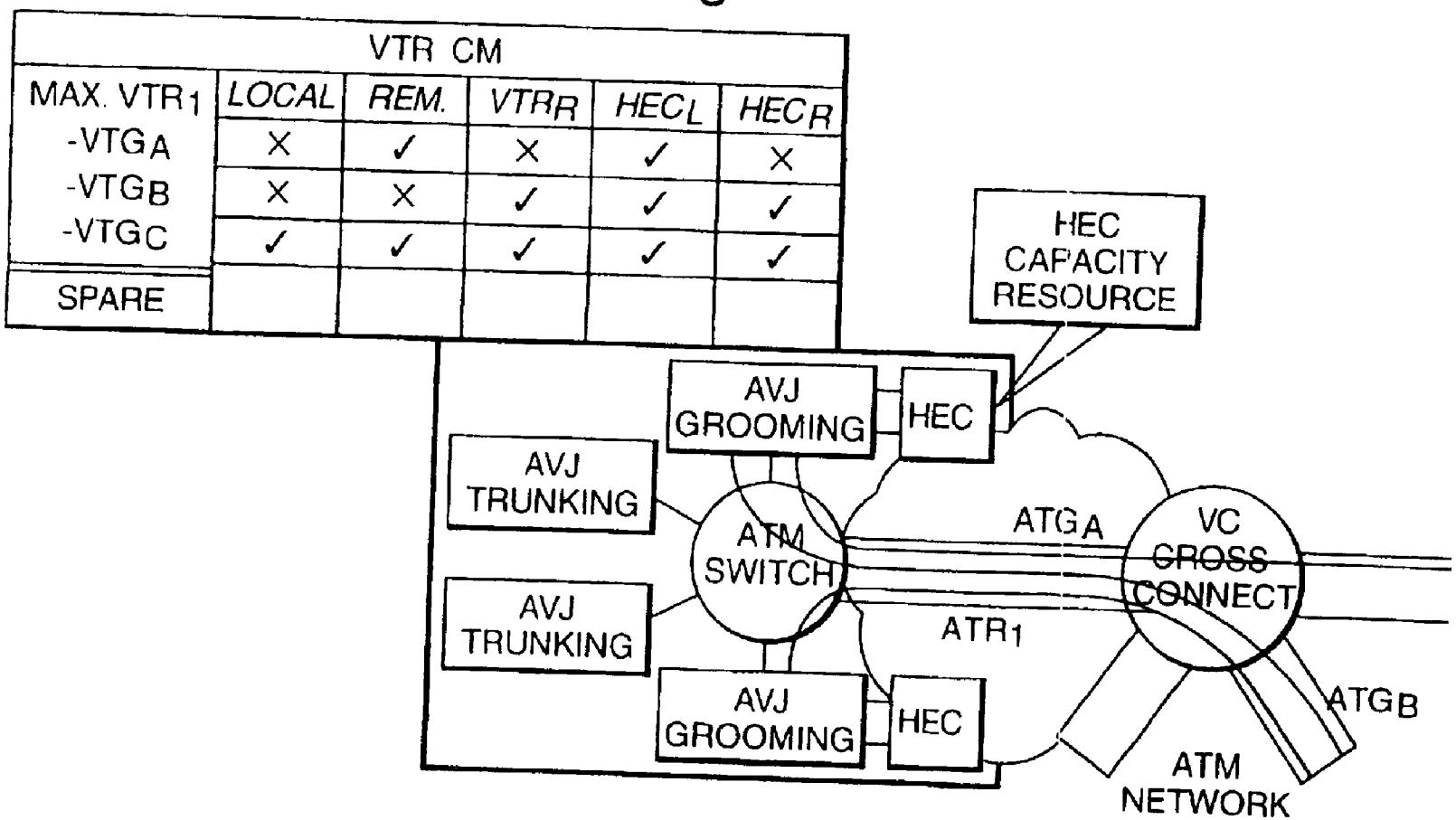
FIG. 16 illustrates an extension of the arrangement of FIG. 13 for specifying available voice band processor capacity.
Figure 17:
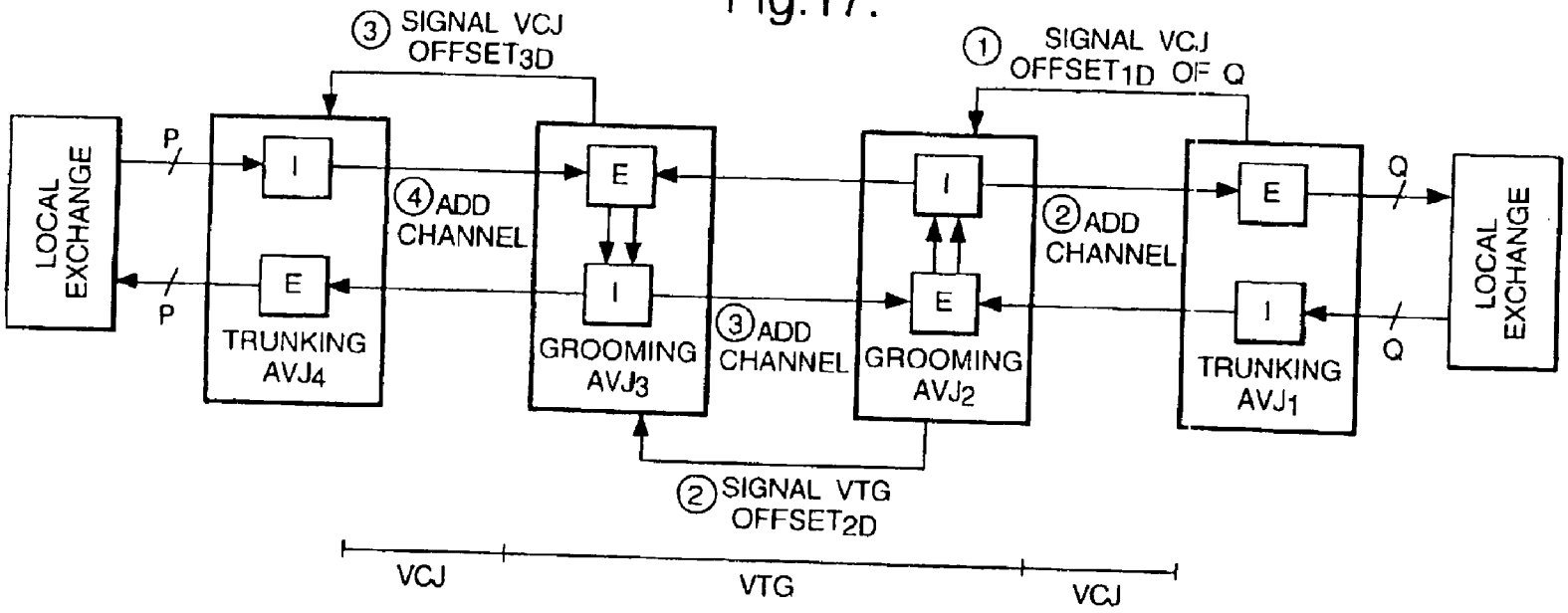
FIG. 17 illustrates a preferred signalling process to create a speech path between AVJs in the network of FIG. 1.

As shown in FIG. 15, the scheme described above with reference to FIG. 14 can be extended to the provision of voice band processors in any given connection. An example of this would be an echo canceller or half echo canceller, where the exchange in its call routing from the signalling will decide, because of the length of the route, or other relevant criteria on a need to apply echo cancellation for example because the call has or will cross some certain delay budget. Because a grooming AVJ has a natural loop back capability where it simply is grooming aggregated local traffic for the wide area network, there is traffic between its ATM domain and its TDM domain and then being mapped back into the ATM domain almost immediately, in performing the grooming function. This traffic may be diverted most advantageously through a voice band processor, for example a half echo canceller, connecting to the grooming AVJs, this being the preferred embodiment although all other placements of echo cancellers or voice bands in the end to end connection may be applied in the ATM or TDM domain. The capacity of the half echo cancellers, because they operate by a paired user port and network port, also represent a resource depleted by utilisation. The grooming AVJ is aware of and controls the maximum capacity of the half echo canceller to which it is immediately attached, and during configuration is informed which timeslots the echo canceller is connected to. Because the grooming AVJ knows the identity of those timeslots and whether they have a half echo canceller configured for them, it can automatically determine what the half echo canceller capacity is that is connected to it, and it can report this together with its own capacity to the VTR capacity monitor. In the United States, inter-exchange carriers on some of their long-routes always need half echo cancellers, but they have a statistical distribution of the need for half echo cancellers. One example would be 30% of all routes having a need for half echo cancellers. By statistically distributing half echo canceller capability across all the grooming AVJs serving such routes, whatever grooming AVJ is chosen there is a statistical chance of having half echo canceller capability if it is necessary. This has the advantage over the use of dedicated grooming AVJs for half echo cancellers by providing greater utilisation efficiency and avoidance of resonance depletion through fragmentation. Connection control may select a VTG without congestion and satisfy the criteria of echo canceller resource if applicable. The half echo cancellers can be readily enabled and disabled by simple loop back control within the grooming AVJ which is another means of inclusion or exclusion of the half echo canceller in the path and this is the preferred means of accommodating signalling schemes which introduce echo cancellers at the outset of a call and then exclude them subsequently through subsequent signalling to ensure optimal placement closest to called party. The grooming AVJs can optimise this function by finding other timeslot means to loop back which do not utilise the half echo canceller resources. The VTR capacity monitor is thus a single reference for all the resources necessary to connect a particular voice path through the network system.

Referring now to FIGS. 17 to 20, these show in sequence the means for actually setting up the voice path between trunk circuits P and Q.

This incorporates a 5 part protocol for signalling over to a cascade of an arbitrary number of multiple stages, Each stage comprises an ingress and a egress process defined with respect to the ATM domain, egress being traffic that emanates from the ATM domain into the TDM domain in all cases. The egress process keeps a record of free channel timeslots and therefore dictates where the offset in any given trunk group, VTG or VCJ of a new channel is going to be by determining where a free timeslot is in relation to the other active channels already in the trunk group and therefore the offset into that group when the new channel is added. A similar process applies to the criteria for removal of an existing channel from the trunk group. Using the offset the egress process can signal to the ingress process which is responsible for assembly of that trunk group into ATM cells, and the ingress process is responsible for adding the channel through the dynamic structure data transfer function of our earlier patent, and the agress process can detect the occurrence of changes in trunk group size and therefore knows that the channel has been connected and can receive subsequently further changes on that particular VTG cor VCJ. This operation process, firstly is single threaded by VTG or VCJ, and the figure illustrates the two parts of the process, firstly signalling an offset from egress to ingress, and secondly making the change to trunk group size, and forwarding the next stage's offset as a fully pipelined process in a unidirectional manner, in which, connecting a voice path in the upstream direction from P to Q is achieved by signalling in the reverse direction from Q to P which is a preferred embodiment, because it minimises the signalling transactions involved, but does not imply the exclusion of signalling in the same direction as the voice circuit and moreover the unidirectional mechanism may be used to effect a bidirectional mechanism by signalling first from Q to P and then in an identical manner for the reverse downstream voice path signalling from P to Q. Once an egress process has signalled an ingress process, the ingress process can transfer signalling to the egress process in the same AVJ for example, the grooming AVJ at stage 2 which in turn determines the offset it needs for the VTG between stage 3 and 2 and signals to that ingress process in stage 3 and so on through the system. The offset may be embodied in a cell referred to as a worm which passes to and fro to set up a bidirectional voice path. Provision is made for AVJ stages 2, 3 and 4 to reject the connection because the congestion indication given by the VTR capacity monitor could be out of date with respect to the true capacity status in any AVJ because of delay race for-resource conditions in the AGR network system. Therefore, a backtracking capability is built into the AVJ connection entities and provision is made for the means to function correctly in the absence of an advertising mechanism in part or in total. Provision is also made for correct operation in the absence of a VTR capacity monitor by a backtrack capability or similar recovery means. The AVJs at stages 1 and 2, may optionally have capability to send a digital signature thereby guarding against any false simulation of that identity intentionally or otherwise. This provides a means of authentication such that each trunking AVJ at the end of a communication path known that it has connected the voice path through to AGR network correctly providing analogous integrity checks in existing narrow-band exchanges which have, for example, a additional integrity pattern or other signalling schemes to ensure proper cross-connection of narrow band channels through the fabric. We envisage sending a digital signature for unambiguously identifying the identities of the trunking AVJs at each end, and the circuits P and Q prior to or subsequent to completion of the voice path, in the bandwidth of that voice path on erection, or prior to dissolution of that voice path in order to provide a means to ensure continual integrity checking on operations pertaining to network connectivity. The grooming AVJs are free to choose any free time slot in their connection map. This need not be prescribed by the worm, but the worm can be annotated with that information so that connection control software can readily use the returned worm acknowledgement to check that the AVJ devices are performing the intended function. This is not a strict requirement, there still being a means for disconnection of any trunk circuit Q from any trunk circuit P by a voice path trace operation.

Figure 18:
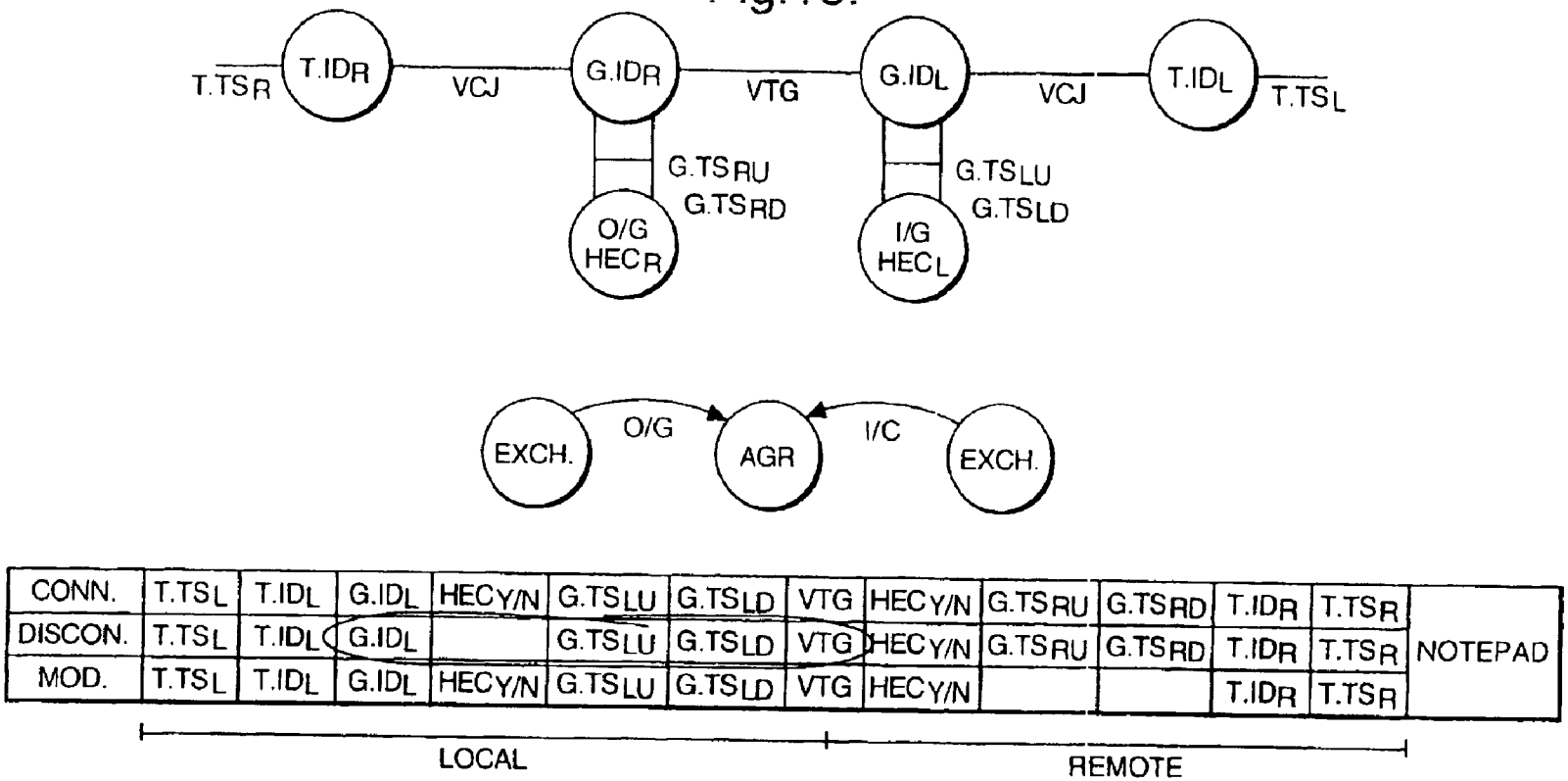
FIG. 18 illustrates the information content required to establish or remove a narrow-band connection.

FIG. 18 shows an example of the main contents of the worm. At the top of the diagram are illustrated functional stages in which TID means Trunking Identity, GID means Grooming Identity and the suffix denotes the local and remote ends. The remote end AGR is the incoming end of the call, and the local end is the outgoing end of the call since the worm begins at the outgoing end. The incoming half echo canceller and the outgoing half echo canceller, are positioned relative to the respective ends of the call. The incoming side is the left hand side, the remote side, because call routing forwarded messages to the right hand side and the preferred embodiment is to send information in the backwards direction initially to minimise transactions. The items in heavy type are those items which are necessary to connect a unique path through the system It should be noted here that the remote trunking time slot P and the remote trunking AVJ identity can be forwarded from the remote end as part of a call routing signalling message and no other topology information regarding the remote AGR is required. For example, under fault or maintenance a remote AGR could independently change its configuration, and the information forwarded need only be valid on a call-by-call basis. There is a window of opportunity of call-by-call resolution for making configuration changes without affecting any other calls in progress in the system. The trunking AVJ ID at the local end, the trunking time slot and the grooming identity which heads the selected VTG are all locally stored topological information. The inclusion or exclusion of echo cancellers is a call-by-call decision process. The central part of FIG. 18 shows that in the AGR network system which connects to peripheral exchanges, any signalling for inclusion or exclusion of incoming or outgoing echo cancellers is associated with the respective side of the call, the exchange on the local side only affects incoming echo cancellers. The exchange on the remote side can be arranged to signal only for outgoing half echo cancellers and this avoids the need to store any information or configuration supervision of echo cancellers in the remote AGR, and local information need be retained during the lifetime and dissolution of a call. The lower portion of FIG. 18 shows three main types of worm operation namely, the connect, the disconnect and the modify commands. The connect command is for setting up the initial voice path and the items which are greyed out are those which can be annotated by the grooming AVJs and stored by connection control if necessary, but which are not absolutely necessary for the system operation. In total these comprise an indication of inclusion or exclusion half echo cancellers and a specification of the exact route that the voice path should take. This facilitates the setting up of point to multi-point connections in the AGR network system. The disconnect command can optionally include the local information which is circled in the figure. In a point-to-multipoint connection, then this information would be needed to specify unambiguously the grooming AVJ identity and there may be more than one voice path through that same grooming AVJ, distinguished by the grooming time slots, which must be passed back from the original connect message. In a point-to-point connection using for example SS7 signalling, these circled pieces of information are not necessary because any time slot P to any other time slot Q has just one unique connection. A disconnect ion can be facilitated by a bare minimum of information of just one end of the connection, for example timeslot Q, and both are not necessary to be known as described herein. The notepad area is used for annotation as the worm is passed forward, for example to hold the offset into the trunk group between each successive AVJ stage. It is distinct from the annotated information uniquely identifying the voice path such as the choice of a grooming time slot. The modify command is associated with further subsequent inclusion or exclusion of echo cancellers in the voice path, which is just one specific example of path modification, all types of modification are envisaged, in this particular case it may be desirable to move a grooming time slot away from a half echo canceller device to a grooming time slot which is a simple loop-back function or vice versa, to free up resources by inverting the original echo canceller indication with an optional facility to specify the grooming time slot and the worm could be subsequently annotated with the new time slot, specifying at minimum, the thinking time slot, the grooming AVJ identity, the indication of half echo canceller and for point-to-multipoint connections above the grooming time slots and the VTG.

Figure 19:
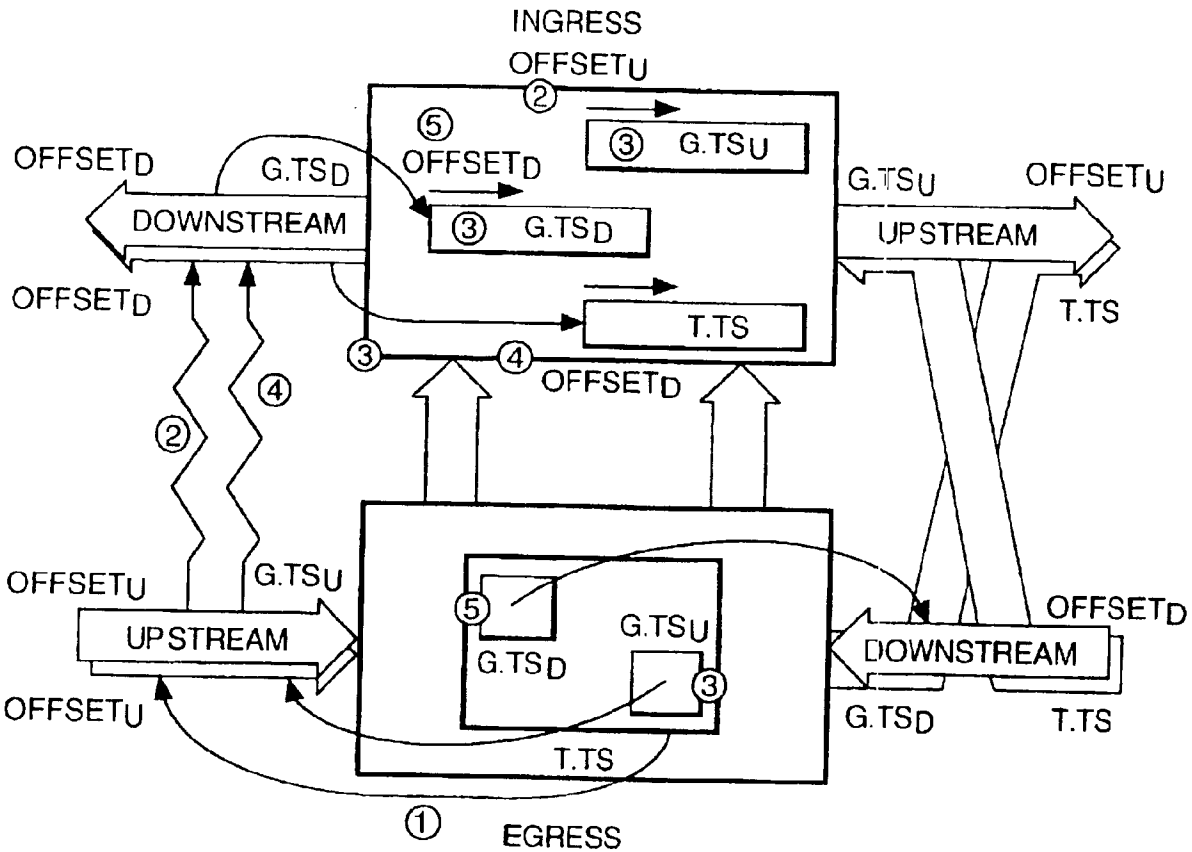
FIG. 19 illustrates a method for tracing a narrow-band connection through the large distributed exchange from a trunk circuit.

FIG. 19 shows the way in which a voice path is traced through the AGR network system. The trunking time slot is common to both the ingress and the egress process for a both-way circuit, and is readily available in the TDM domain. Hence the trunking time slot for both ingress and egress processes with respect to the ATM is known such that, at step 1, the trunking timeslot location in the egress connection map contains a particular VCJ identity and the connection entity for that VCJ the offset of that trunking time slot in the VCJ trunk group, Trunking Time Slot (T.TS) in the upstream direction. That offset can be passed to the next AVJ stage, the grooming AVJ. Since VCJs are configured as reciprocating pairs, at step 2, knowing the upstream VCJ also means knowing the downstream VCJ. The ingress process can then, from the VCJ connection map, determine the offset of the trunking time slot T.TS (step 3) in that particular VCJ, the offset downstream, offset D. (step 4) The offset of the upstream and the downstream direction in the trunking AVJ have now been determined and can be passed by signalling as described above to the grooming AVJ in the next stage of the connection. At the grooming AVJ, from the offset in the upstream direction in the given VCJ, the ingress process at step 2 can determine the grooming timeslot in the upstream direction (step 3) which is the timeslot used in the upstream direction on the VCJ side and on the VTG side. From the grooming timeslot in the upstream direction the egress process can determine the VTG from the contents of the location in the map and in an identical manner to the trunking AVJ stage, can determine the offset of that grooming timeslot in the VTG trunk group, the offset in the upstream direction (step 3). From the offset in the downstream the egress process can determine the particular grooming timeslot in the downstream trunk group that occurs at that offset (step 5) and consequently from complementary pair of the upstream VTG, it determines the downstream VTG at step 4. The ingress process can thus determine the offset in the downstream direction of that grooming timeslot in that particular downstream VTG also at step 5, and thus the offset in the downstream direction and the offset in the upstream direction can be signalled to the next grooming or trunking stage, and the process can continue in a cascade in a similar manner so as to determine the complete voice path through to the trunk circuit P at the remote end. This provides resilience of the system, for as long as the hardware is reliable. Even where the software could be largely out-of-date, it could always recover the hardware state and determine what voice paths are established in the network, and resume full operation subsequently.

Figure 20:
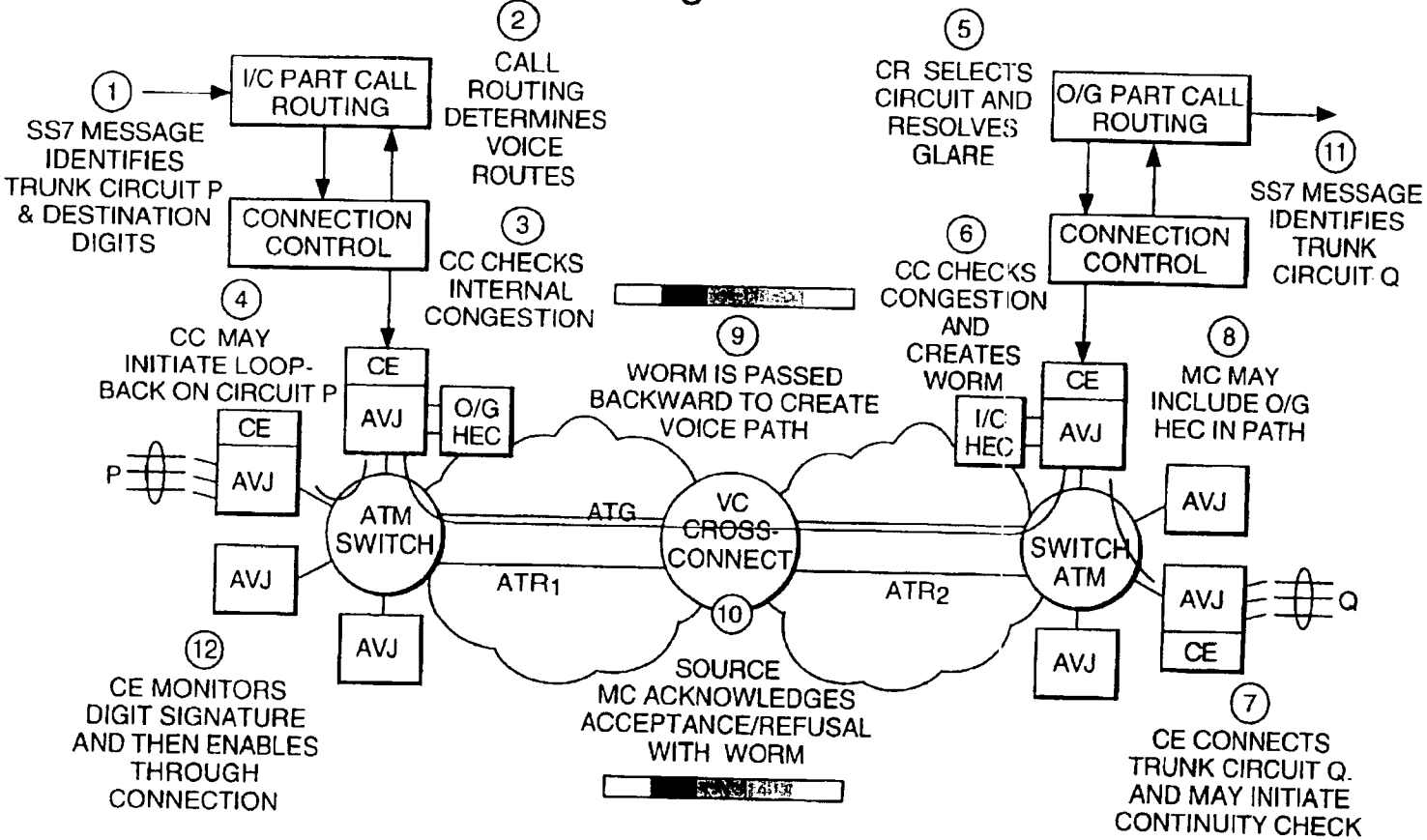
FIG. 20 illustrates the overall protocol for establishing a connection end to end in the layers Call Routing and Connection Control and at physical layers.

FIG. 20 shows the overview of the whole wormhole protocol. Step 1 shows the ITU SS7 message, i.e. the IAM message identifying trunk circuit P. This also contains dialled digits which call routing processes, determines the voice route by consideration for external congestion and a prioritised set of external voice routes (step 2) which it passes to connection control at step 3. Connection control checks the internal congestion from the VTR capacity monitors and, if necessary, (step 4), connection control may also initiate any SS7 loop back continuity checks on trunk circuit P or any other type of continuity check appropriate to the signalling system employed. Connection control eliminates those routes which are unreachable through internal congestion and puts forward its preferred route for load balancing where there is an equal external voice route. Call routing determines the final choice of voice route and forwards the message. At step 5 the outgoing call routing selects the outgoing trunk circuit and resolves any glare (contention for trunk circuits that may be coming in from its own incoming process on this AGR). Once the circuit is selected, connection control checks internal congestion again through the VTR capacity monitors and makes a final selection of the VTG that connects the associated pair of AGRs and creates a worm which comprises sufficient topological information to connect trunk circuit Q to trunk circuit P via the chosen VTG and forwards this at step 7 to the connection entity inside the trunking AVJ hosting Q, which may also initiate a continuity check or any other scheme provided by the signalling system on trunk circuit Q step 8. The worm is passed forward through the grooming AVJ stages which may optionally include or exclude half echo cancellers in this path initially, and they may be excluded at any later stage by a modified worm. The grooming AVJ forwards the worm through the VTG to the remote AGR on the incoming side (step 9) which connects the path through to trunk circuit P and also then passes the worm back in the reverse direction (step 10) to set up in the reverse direction. As a form of acknowledgement, the annotated information as to what the path was in the worm information is stored in connection control at both ends so that the path can be torn down from either end using any of the existing schemes in the signalling system. Once the worm has passed back to the outgoing side it is passed back to connection control and call routing which will then signal an outgoing IAM message (step 11) so as to enable through-connections which are shown as switches in FIG. 20. It thus facilitates the connection of a voice path through this single large distributed exchange system. Step 12 is an optional stage to check the integrity of the voice path to enable the through connection and the outgoing IAM message.

The arrangement and method described provide for the distribution of the exchange in terms of its fabric and its control and its enabling technologies with reference to the dynamic structure data transfer. There is uncommitted bandwidth within the fabric and consequently routing decisions can be fully independent of the operation of this distributed fabric. The distributed fabric can, because of this unallocated bandwidth use separate connections to the control layer for establishing the connections through the fabric and this in no way compromises external decisions that are made except when an overload situation is encountered. An advertising process provides knowledge of the distributed fabric. This includes local knowledge about a remote site such that routing decisions can be made and modified where necessary so as to reject traffic at source. The dynamic trunking enables the separation of call routing and connection control. The arrangement also provides a means of ensuring stability under overload situations and minimising the cost of handling traffic which would be rejected by destinations.

The separation of call routing and connection control together with advertising the system status ensures a wide range of scalability so that the application of dynamic trunking technology provides scalability in a traffic sense. Further, the separation of call routing and connection control provides a distributed computing environment which is scaleable and managed by this advertisement resource. Because the distributed exchange manages its own internal traffic, effectively it provides means for balancing that traffic to the fabric and makes its own internal routing decisions. Once that network grows through its scalability, a local exchange can dual home on to it and allow it to make its own routing decisions. The local exchange does not have to make any individual routing decisions to a variety of traffic exchanges. The separation further provides a facility to support a wide range of services using other signalling schemes. The fabric provides a connection engine that can accommodate a wide variety of signalling protocols appropriate for the type of service to be provided and that can set up connections.

The full knowledge of the network connectivity and the release of resources can be enabled by any node within the network, as it can trace through all connections from any starting point. This can be used to support failure recovery.

It will be appreciated that although the arrangement and method have been described above with particular reference to current standard protocols, such as SS7 signalling, it is in no way limited to the use of these particular protocols.

What is claimed is:

1. A telecommunications system comprising:

an asynchronous transfer mode (ATM) network; and a plurality of adaptive grooming routers (AGRs) coupled to the network, each AGR comprising an ATM switch including at least one adaptive virtual junctor (AVJ) for adapting narrowband traffic received at said AGR to/from the ATM adaptation layer, wherein the AGRs are interconnected across the ATM network by virtual trunks and are arranged to function as a distributed narrowband exchange to set up narrowband connections across the ATM network.

2. A telecommunications system as claimed in claim 1, wherein a plurality of local exchanges are coupled to the network and wherein the local exchanges are dual homed to the network.

3. A telecommunications system as claimed in claim 2, wherein the network incorporates means for load balancing of traffic originating from the local exchanges.

4. A telecommunications system as claimed in claim 1, wherein the virtual transit exchange comprising the AGRs incorporates independent connection control and call routing functions.

5. A telecommunications system as claimed in claim 4, wherein the call routing function is adapted to perform a selection of potential voice routes and to prioritise that selection.

6. A telecommunications system as claimed in claim 5, wherein said prioritisation is performed from an assessment of congestion of said potential voice routes.

7. A telecommunications system as claimed in claim 4, wherein the service and connection aspects of the connection control function are separated whereby to facilitate support of advanced services and a plurality of connection models.

8. A telecommunications system as claimed in claim 5, wherein said call routing function incorporates means for determining availability of a destination and for rejecting at source traffic to that destination in the event that the destination is unavailable.

9. A telecommunications system as claimed in claim 1 and incorporating means for providing a narrow band multicast function.

10. A telecommunications system as claimed in claim 1 and incorporating means for voice path tracing whereby to effect failure recovery.

11. A telecommunications system as claimed in claim 1 including means for determining the current traffic status of the system whereby to effect routing of narrow band traffic across the system.

12. A method of [routing] *handling* telecommunications traffic in a *telecommunications* system, *the method* comprising *the steps of*:

[an asynchronous transfer mode (ATM) network; and]

*interconnecting* a plurality of [adaptive grooming] routers [(AGRs)] coupled to [the] *an asynchronous transfer mode (ATM)* network, [each AGR comprising an ATM switch including at least one adaptive virtual junctor (AVJ) for adapting narrowband traffic received at said AGR to/from the ATM adaptation layer,] *the interconnecting being by virtual trunks across the ATM network*,

[wherein the AGRs are interconnected across the ATM network by virtual trunks and are arranged] *arranging the routers* to function as a distributed narrowband exchange to set up narrowband connections across the ATM network*; and*

*adapting narrowband traffic received at a said router to/from an ATM adaptation layer*.

13. A method as claimed in claim 12, [wherein] *comprising determining* a set of potential voice routes [are determined] for a connection and [wherein a prioritisation of] *prioritizing* said routes [is performed] from an assessment of congestion of said potential voice routes.

14. A method as claimed in claim 13, [wherein] *comprising determining* the availability of a destination [is determined] and *rejecting* traffic to that destination at source in the event that the destination is unavailable.

15. A method as claimed in claim 12, [wherein] *comprising determining* the current traffic status of the system [is determined] prior to effecting routing of narrowband traffic across the system.

16. A telecommunications system comprising:

an asynchronous transfer mode (ATM) network; and a plurality of adaptive grooming routers (AGRs) coupled to the network, each AGR comprising an ATM switch including means for adapting narrowband traffic received at said AGR to/from the ATM adaptation layer, wherein the AGRs are interconnected across the ATM network by virtual trunks and are arranged to function as a distributed narrowband exchange to set up narrowband connections across the ATM network.

*17. A telecommunications system comprising:*

*a broadband digital communications network; and*

*a plurality of adaptive grooming routers (AGRs) coupled to the network, each AGR comprising a traffic switch including at least one adaptive virtual junctor (AVJ) for adapting narrowband traffic received at said AGR to/from the network,*

*wherein the AGRs are interconnected across the network by virtual trunks and are arranged to function as a distributed narrowband exchange to set up narrowband connections across the network.*

*18. A telecommunications system according to claim 17, wherein a plurality of local exchanges are coupled to the network.*

*19. A telecommunications system according to claim 18, wherein the local exchanges are dual homed to the network.*

*20. A telecommunications system according to claim 19, wherein the network incorporates means for load balancing of traffic originating from the local exchanges.*

*21. A telecommunications system according to claim 17, wherein the distributed narrowband exchange incorporates independent connection control and call routing functions.*

*22. A telecommunications system according to claim 21, wherein the call routing function is arranged to perform a selection of at least one potential voice route.*

*23. A telecommunications system according to claim 21, wherein the call routing function is arranged to perform a selection of potential voice routes and to prioritise that selection.*

*24. A telecommunications system according to claim 23, wherein said prioritisation is performed from an assessment of congestion of said potential voice routes.*

*25. A telecommunications system according to claim 21, wherein connection control and call routing functions are separated whereby to facilitate support of advanced services and a plurality of connection models.*

*26. A telecommunications system according to claim 21, wherein said call routing function incorporates means for*

*determining availability of a destination and for rejecting at source traffic to that destination in the event that the destination is unavailable.*

*27. A telecommunications system according to claim 17 and incorporating means for providing a narrow band multicast function.*

*28. A telecommunications system according to claim 17 and incorporating means for voice path tracing whereby to effect failure recovery.*

*29. A telecommunications system according to claim 17 including means for determining the current traffic status of the system whereby to effect routing of narrow band traffic across the system.*

*30. A telecommunications system according to claim 17, wherein the network is a packet-switched network.*

*31. A telecommunications system according to claim 17, wherein the network is a connection-oriented network.*

*32. A telecommunications system according to claim 31, wherein the network is an asynchronous transfer mode (ATM) network.*

*33. A telecommunications system according to claim 32, wherein the traffic switch is an ATM traffic switch and the AVJ is for adapting narrowband traffic received at a said AGR to/from an ATM adaptation layer for the ATM network.*

*34. A telecommunications system according to claim 17, wherein the network is a wide area network (WAN).*

*35. A method of handling telecommunications traffic in a telecommunications system, the method comprising the steps of:*

*interconnecting a plurality of routers coupled to a broadband digital communications network, the interconnecting being by virtual trunks across the network;*

*arranging the routers to function as a distributed narrowband exchange to set up narrowband connections across the network; and*

*adapting narrowband traffic received at a said router to/from the network.*

*36. A method according to claim 35, comprising determining one or more potential voice routes for a connection.*

*37. A method as claimed in 35, comprising determining a set of potential voice routes for a connection and prioritizing said routes from an assessment of congestion of said potential voice routes.*

*38. A method as claimed in 35, comprising determining the availability of a destination and rejecting traffic to that destination at source in the event that the destination is unavailable.*

*39. A method as claimed in 35, comprising determining the current traffic status of the system prior to effecting routing of narrowband traffic across the system.*

*40. A method according to claim 35, wherein the network is a packet-switched network.*

*41. A method according to claim 35, wherein the network is a connection-oriented network.*

*42. A method according to claim 41, wherein the network is an asynchronous transfer mode (ATM) network.*

*43. A method according to claim 35, wherein the network is a wide area network (WAN).*

*44. An adaptive grooming router (AGR) for use in a telecommunications system comprising a broadband digital communications network to which the AGR may be coupled, the AGR comprising:*

*a traffic switch including at least one adaptive virtual junctor (AVJ) for adapting narrowband traffic received at said AGR to/from the network, and*

*an interface for interconnecting the AGR with one or more other AGRs across the network by virtual trunks,*

*wherein the AGR is arranged to function as at least part of a distributed narrowband exchange for setting up narrowband connections across the network.*

*45. An AGR according to claim 44, wherein the AGR incorporates a connection control function.*

*46. An AGR according to claim 45, wherein the AGR incorporates a call routing function.*

*47. An AGR according to claim 46, wherein the connection control function and the call routing functions are independent.*

*48. An AGR according to claim 46, wherein the call routing function is arranged to perform a selection of at least one potential voice routes.*

*49. An AGR according to claim 46, wherein the call routing function is arranged to perform a selection of potential voice routes and to prioritise that selection.*

*50. An AGR according to claim 49, wherein said prioritisation is performed from an assessment of congestion of said potential voice routes.*

*51. An AGR according to claim 46, wherein the connection control and call routing functions are separated whereby to facilitate support of advanced services and a plurality of connection models.*

*52. An AGR according to claim 46, wherein said call routing function incorporates means for determining availability of a destination and for rejecting at source traffic to that destination in the event that the destination is unavailable.*

*53. An AGR according to claim 44, wherein the network is a packet-switched network.*

*54. An AGR according to claim 44, wherein the network is a connection-oriented network.*

*55. An AGR according to claim 54, wherein the network is an asynchronous transfer mode (ATM) network.*

*56. An AGR according to claim 55, wherein the traffic switch is an ATM traffic switch and the AVJ is for adapting narrowband traffic received at said AGR to/from an ATM adaptation layer for the ATM network.*

*57. An AGR according to claim 44, wherein the network is a wide area network (WAN).*

*58. A method of routing traffic in a telecommunications system the method comprising the steps of:*

*interconnecting a plurality of routers across a broadband digital communications network by virtual trunks;*

*setting up narrowband connections across the network using the virtual trunks, the plurality of routers thereby being arranged to function as a distributed narrowband exchange; and*

*adapting narrowband traffic received at one of said routers to/from the network.*

*59. A method according to claim 58, comprising the step of:*

*determining one or more potential voice routes for a connection.*

*60. A method according to claim 58, comprising the steps of:*

*determining a set of potential voice routes for a connection; and*

*prioritising said routes from an assessment of congestion of said potential voice routes.*

*61. A method according to claim 58, comprising the steps of:*

*determining the availability of a destination; and*

*rejecting at source traffic to that destination in the event that the destination is unavailable.*

*62. A method according to claim 58, comprising the steps of:*

*determining the current traffic status of the system; and*

*routing narrowband traffic across the system in dependence on the determined current traffic status.*

*63. A method according to claim 58, wherein the network is a packet-switched network.*

*64. A method according to claim 58, wherein the network is a connection-oriented network.*

*65. A method according to claim 64, wherein the network is an asynchronous transfer mode (ATM) network.*

*66. A method according to claim 58, wherein the network is a wide area network (WAN).*

* * * * *